US010102844B1

United States Patent
Mois et al.

(10) Patent No.: US 10,102,844 B1
(45) Date of Patent: Oct. 16, 2018

(54) SYSTEMS AND METHODS FOR PROVIDING NATURAL RESPONSES TO COMMANDS

(71) Applicant: Amazon Technologies, Inc., Seattle, WA (US)

(72) Inventors: Remus Razvan Mois, Eastern Pomerania (PL); Marco Nicolis, Gdansk (PL)

(73) Assignee: Amazon Technologies, Inc., Seattle, WA (US)

( * ) Notice: Subject to any disclaimer, the term of this patent is extended or adjusted under 35 U.S.C. 154(b) by 28 days.

(21) Appl. No.: 15/083,953

(22) Filed: Mar. 29, 2016

(51) Int. Cl.
*G10L 15/00* (2013.01)
*G10L 13/027* (2013.01)
*G10L 15/22* (2006.01)
*G10L 15/26* (2006.01)
*G10L 13/08* (2013.01)
*G10L 15/24* (2013.01)
*G10L 15/18* (2013.01)
*G10L 15/08* (2006.01)

(52) U.S. Cl.
CPC .......... *G10L 13/027* (2013.01); *G10L 13/086* (2013.01); *G10L 15/1815* (2013.01); *G10L 15/22* (2013.01); *G10L 15/24* (2013.01); *G10L 15/26* (2013.01); *G10L 2013/083* (2013.01); *G10L 2015/088* (2013.01); *G10L 2015/223* (2013.01)

(58) Field of Classification Search
USPC ........................ 704/7–10, 220, 233, 235, 258
See application file for complete search history.

(56) References Cited

U.S. PATENT DOCUMENTS

| 8,515,737 | B2 | 8/2013 | Allen | |
|---|---|---|---|---|
| 9,146,904 | B2 | 9/2015 | Allen | |
| 2007/0185843 | A1* | 8/2007 | Jones | ................ G06F 17/30864 |
| 2011/0010367 | A1* | 1/2011 | Jockish | ............ G06F 17/30675 |
| | | | | 707/733 |
| 2012/0185484 | A1* | 7/2012 | Jones | ................... G06Q 10/101 |
| | | | | 707/740 |

(Continued)

OTHER PUBLICATIONS

Article—AI—Intro to Automated Content: Key Concepts, Examples, and More—Posted Apr. 18, 2016.

*Primary Examiner* — Leonard Saint Cyr
(74) *Attorney, Agent, or Firm* — Pierce Atwood LLP

(57) ABSTRACT

Methods and devices for generating unique and different responses to commands are described herein. Natural language generation techniques may be employed to formulate responses to commands that are tailored to particular users. These responses account for previously provided responses, previously commands that have been made, and/or geographic locations of the requesting individual, for example. In some embodiments, an audible command may be received by a backend system from a voice activated electronic device. Text data may be generated from the audible command, and a user intent of the command is determined. Based on the user intent, a response from a particular application may be obtained. The response may be compared with previously generated responses and, if a similar responses was determined to have been provided previously, one or more different words, or a different arrangement of words, may be used to generate a new response.

24 Claims, 8 Drawing Sheets

(56) References Cited

U.S. PATENT DOCUMENTS

| | | | |
|---|---|---|---|
| 2013/0346396 A1* | 12/2013 | Stamm | G06F 17/30867 707/722 |
| 2015/0052128 A1* | 2/2015 | Sharifi | G06Q 30/0631 707/727 |
| 2015/0178392 A1* | 6/2015 | Jockisch | G06F 17/30867 707/706 |

* cited by examiner

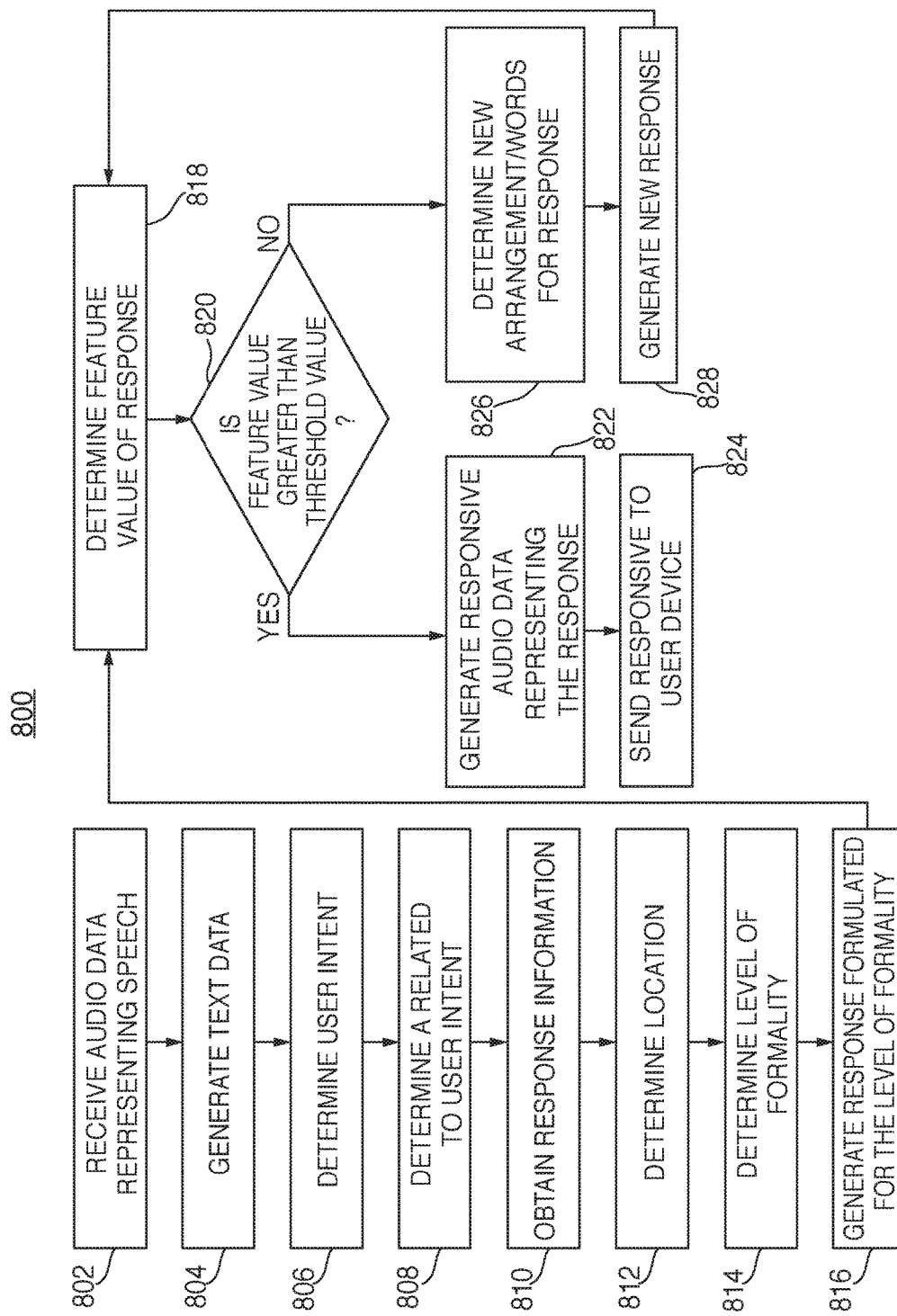

US 10,102,844 B1

SYSTEMS AND METHODS FOR PROVIDING NATURAL RESPONSES TO COMMANDS

BACKGROUND

Interactions with voice controlled electronic devices have become increasingly more prevalent as the functionality and capabilities of these devices have increased. Responses to an individual's commands for their voice controlled electronic device generally are formed using pre-formulated response templates. After an appropriate response template is selected for a particular response, the pertinent response information may be inserted into the response template at a predefined position.

BRIEF DESCRIPTION OF THE DRAWINGS

FIG. 8 is illustrative flowchart of a process for providing a response based on a feature value, in accordance with various embodiments.

DETAILED DESCRIPTION

Figure 1:
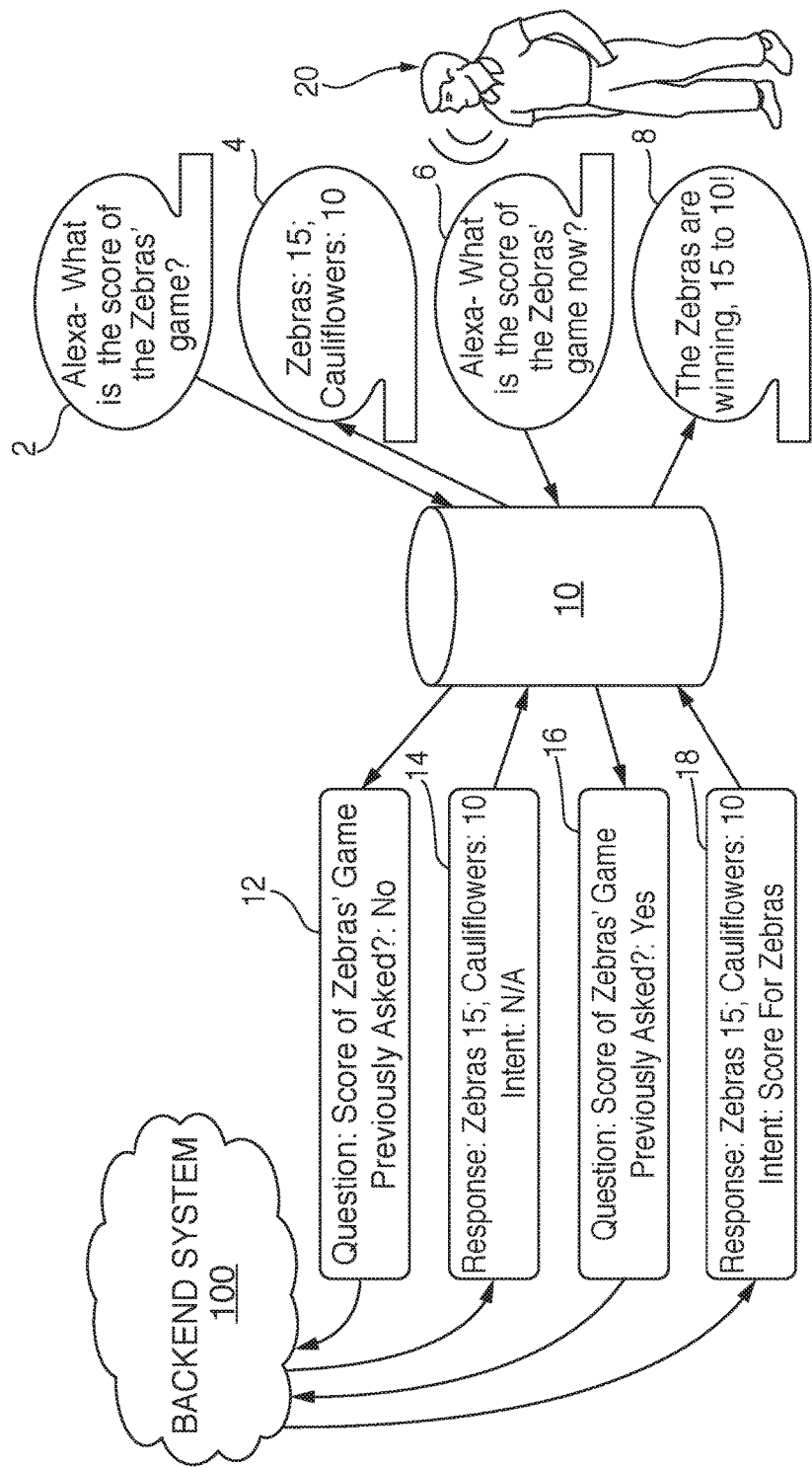
FIG. 1 is an illustrative diagram of a system for providing responses to an individual, in accordance with various embodiments.

The present disclosure, as set forth below, is generally directed to various embodiments of methods and devices for generating and providing natural and intuitive responses to commands. A sound controlled electronic device, as described herein, is a device capable of being activated in response to detection of a specific sound (e.g., a word, a phoneme, a phrase or grouping of words, or any other type of sound, or any series of temporally related sounds). For example, a voice activated electronic device is one type of sound controlled electronic device. Such voice activated electronic devices, for instance, are capable of obtaining and outputting audio data in response detecting a wakeword. A manually activated electronic device, as described herein, is a device capable of being activated in response to a manual input from an individual (e.g., pressing a button, touching a portion of a touch screen, performing an action on a device). For example, a tap-to-talk electronic device is one type of manually activated electronic device. Such tap-to-talk electronic devices, for instance, are capable of obtaining and outputting audio data in response to a button being pressed by an individual.

Providing natural and fluid responses to commands or inquiries made towards an individual's voice activated electronic device or manually activated electronic device may enable the individual to interact with their electronic device in a much more free and easy manner. This further improves an overall user experience with their voice activated electronic device and/or manually activated electronic device, increases an individual's trust with their voice activated electronic device and/or manually activated electronic device, and provides individuals with greater confidence to use their voice activated electronic devices and/or manually activated electronic device for more and more aspects of their daily lives. For example, providing an individual with a response to a command that uses a level of formality that the individual is akin to using may make the individual feel more comfortable interacting with their voice activated electronic device. As another example, providing a response that is in a language or dialect that the individual typically converses increases the familiarity felt between the individual and their voice activated electronic device and/or manually activated electronic device.

In one exemplary, non-limiting embodiment, an individual may speak an audible command, such as a question, to their voice activated electronic device. The audible command may be prefaced by a wakeword, which causes the voice activated electronic device to begin capturing audio data. As another exemplary embodiment, an individual may press a button on their manually activated electronic device, and after pressing the button may speak an audible command, such as a question. In response to pressing the button, the manually activated electronic device may be capturing audio data. The audio data representing the question may then be sent to a backend system to be processed and analyzed, as well as to have a response generated. Upon receipt, the backend system may generate text data by executing speech-to-text functionality on the audio data, as well as determine an intent of the question that was asked using natural language understanding functionality. As an illustrative example, the question may be, "What is the score of the baseball game?" or "What is the weather currently like?"

Depending on the intent of the command, such as a request for a score of a game or a weather forecast, a particular application, such as a category server, located on the backend system may be accessed to obtain the relevant information for that command. Continuing the example above, a sports application may be accessed, and a score of a baseball game for a particular baseball team may be obtained in response to it being determined that the question was for the score of the baseball game. In some embodiments, the application may be located "locally" on the backend system (e.g., a first party application), however in other embodiments the application may be located "external" to the backend system (e.g., a third party application).

In some embodiments, an individual may ask a question that has already been asked, and the previously asked question may have had a response previously generated for it. For example, an individual may ask for a score of the baseball game for a particular baseball team, and then at a latter point in time (e.g., a few minutes or hours later), may again ask for the score of that baseball game. The questions or commands that have been asked, as well as the responses to those questions or commands may be stored on the backend system for future reference. Furthermore, a time/date of when the questions or commands were asked may also be stored on the backend system. In some embodiments, because an individual asked a question regarding a particular subject matter multiple times within a predefined amount of time, it may be determined that the individual has an interest in that subject matter. For example, asking for the score of the Seattle Zebras' baseball game multiple times may indicate that individual favors the Seattle Zebras. Thus, because the individual continually asked for the score of the Seattle Zebras' baseball game, a user preference for the Seattle Zebras' may be stored within the individual's user profile on the backend system.

Based on the individual's determined user preference, a level of formality to be used for a response to the question may be determined. For example, because the individual asked for the score of the Seattle Zebras, the backend system may select words or phrases that are typically used to describe a baseball game or sporting event (e.g., "The Zebras are winning," "The Zebras' are losing," "It's all tied up"). As another example, a dialect or accent for a particular region associated with where the voice or manually activated electronic device is located may be determined, and the dialect or accent may be used to select words or a set of words for a response to the question. Furthermore, a pronunciation of the selected words may also be determined. Words to be used for the response may then be selected from the set of words, and an order or arrangement of the selected words may then be determined based on the individual's user preference (e.g., a fan of the Seattle Zebras), as response information obtained to respond to the command (e.g., a score of the Zebras' game). For example, if it is determined that the individual is a fan of the Seattle Zebras, and the score of the baseball game is Seattle Zebras 5, Chicago Cauliflowers 1, then the selected words may be arranged so that the Seattle Zebras' score is provided first (e.g., "The Zebras are winning, 5 to 1").

A response to the question may be generated and compared with one or more previously generated responses, which may also be stored on the backend system. For example, the currently generated response may be compared to every previously generated response to determine if the words used are substantially the same. In some embodiments, a similarity value may be determined between the currently generated response and one or more of the previously generated responses. Two responses may be "similar" if the similarity value is determined to be greater than a predefined similarity threshold value. If the similarity value is greater than the predefined similarity threshold value, then a new response, or a new ordering or arrangement of the words used for the previously generated response, may be produced. A similarity value between the new response and each previously generated response may then be determined. If the new similarity value is still greater than the predefined similarity threshold value, then another new response may be generated, and another new similarity value may be determined. This process may repeat until the similarity value that is determined is less than the predefined similarity threshold value. However, if the new similarity value is less than the predefined similarity threshold value, then the new response may be selected. Responsive audio data representing the new response may be generated using text-to-speech functionality, and the responsive audio data may be sent back to the requesting voice activated electronic device or manually activated electronic device.

Spoken voice commands, in some embodiments, are prefaced by a wakeword, which may also be referred to as a trigger expression, wake expression, or activation word. In response to detecting the wakeword, a voice activated electronic device is configured to detect and interpret any words that subsequently follow the detected wakeword as actionable inputs or commands. In some embodiments, however, the voice activated electronic device may be activated by a phrase or grouping of words, which the voice activated electronic device may also be configured to detect, and therefore the voice activated electronic device may also be able to detect and interpret any words subsequently following that phrase.

As used herein, the term "wakeword" may correspond to a "keyword" or "key phrase," an "activation word" or "activation words," or a "trigger," "trigger word," or "trigger expression," among other things. One exemplary wakeword may be a name, such as the name, "Alexa," however persons of ordinary skill in the art will recognize that the any word (e.g., "Amazon"), or series of words (e.g., "Wake Up" or "Hello, Alexa") may alternatively be used as the wakeword. Furthermore, the wakeword may be set or programmed by an individual operating a voice activated electronic device, and in some embodiments more than one wakeword (e.g., two or more different wakewords) may be available to activate a voice activated electronic device. In yet another embodiment, the trigger that is used to activate a voice activated electronic device may be any series of temporally related sounds.

In some embodiments, the trigger may be a non-verbal sound. For example, the sound of a door opening, an alarm going off, glass breaking, a telephone ringing, or any other sound may alternatively be used to activate a sound controlled electronic device. In this particular scenario, detection of a non-verbal sound may occur in a substantially similar manner as that of a verbal wakeword for a voice activated electronic device. For example, the sound of a door opening, when detected, may activate a sound activate electronic device, which in turn may activate a burglar alarm.

FIG. 1 is an illustrative diagram of a system for providing responses to an individual, in accordance with various embodiments. In one exemplary embodiment, individual 20 may ask a first question 2, which may be detected by voice activated electronic device 10. For example, individual 20 may say, "Alexa—What is the score of the Zebras' game?" In response to detecting a wakeword, such as "Alexa," voice activated electronic device 10 may begin recording audio. The recorded audio may include all of question 2, such as the wakeword plus the command, or it may only include a portion of question 2 occurring after the wakeword's utterance. In some embodiments, a manually activated electronic device may be employed instead of voice activated electronic device 10. In this particular scenario, individual 20 may press a button located on their manually activated electronic device, or individual 20 may perform any suitable action, to cause their manually activated electronic device to begin capturing audio data. Thus, in this particular scenario, question 2 may not include an utterance of a wakeword, and the audio data that is captured may correspond to audio detected after the button is pressed, or after any other suitable manually input mechanism is invoked.

Voice activated electronic device 10 may then provide backend system 100 with audio data 12 representing question 2 (or a portion of question 2). As described in greater detail below, backend system 100 may execute speech-to-text functionality on audio data 12, thereby generating text data representing question 2. After the text data is generated, natural understanding functionality may be employed to determine a user intent for question 2 and, based on the determined user intent, an appropriate application may be accessed to obtain an answer to question 2. For example, the user intent of question 2 may be related to a score of the Zebras' baseball game, and therefore backend system 100 may access a sports application to obtain a current score of the baseball game. In some embodiments, backend system 100 may also determine whether or not question 2 has previously been asked. For example, backend system 100 may search through a question database corresponding to a user account of individual 2 to determine whether individual 2 had previously asked for the score of the Zebras' game. The search may be concentrated to only a finite time period, such as questions that have been asked within the past few minutes, hours, or days, or the search may scan through an entire history of questions that have been asked.

After response information, such as a score of the Zebras' baseball game, has been obtained from an appropriate application (e.g., a sports application), a response may be generated including the response information. The response may be generated based on a level of formality, a dialect/accent or language associated with individual 20, or using any other suitable criteria. However, in some embodiments, no formality may be used when generating the response, and the response information may simply be provided. For example, response 14 may be generated such that it only includes the score of the Zebras' baseball game: "Zebras 15; Cauliflowers 10." Responsive audio data representing response 14 may then be generated by backend system 100 using text-to-speech functionality, and the responsive audio data may be sent back to voice activated electronic device 10, which in turn outputs audible message 4—"Zebras: 15; Cauliflowers: 10"—to individual 20.

At a later time (e.g., a few minutes or hours later), individual 20 may ask a question 6, which may also be detected by voice activated electronic device 10. For example, individual 20 may say, "Alexa—What is the score of the Zebras' game now?" In response to detecting the wakeword (e.g., "Alexa"), voice activated electronic device 10 may begin recording audio including some or all of question 6. Upon recording the audio of question 6, voice activated electronic device 10 may provide audio data 16 representing question 6 to backend system 100. Backend system 100 may, in turn, generate text data representing question 6 and may determine the user intent of question 6.

In some embodiments, in addition to determining the user intent corresponding to question 6, backend system 100 may also determine that question 6 is substantially similar to question 2. For example, a similarity value may be determined between question 6 and question 2. If the similarity value between the two questions is greater than a similarity threshold value, then the two questions may be said to be similar (e.g., same words, similar words, similar phrasing, similar application, similar user intent, etc.). In some embodiments, backend system 100 may search through a command history stored in a user account for individual 20 for previous commands. Backend system 100 may also determine that, because individual 20 asked both question 2 and question 6 having a same user intent (e.g., a score of the Zebras' game), that individual 20 has a user preference for that user intent (e.g., the Zebras). In other words, backend system 100 may recognize, based on common user intent of both questions 2 and 6, that individual 20 is a fan of the Zebras' team. This information may be leveraged to generate a response that is tailored for a fan of the Zebras' team. For example, both questions 2 and 6 may use the "Zebras'" in a possessive format. Thus, questions 2 and 6 may both be structured in the context of a fan of the Zebras', and therefore a user preference as favorable for the Zebras.

Backend system 100 may receive response information for a response to question 6 from the same sports application used to obtain the response information for response 14, indicating a current score of the Zebras' baseball game as well as an intent of question 6. For example, the score of the game may still be: "Zebras: 15; Cauliflowers: 10," however backend system 100 may now recognize that individual 20 is a fan of the Zebras. Thus, when response 18 is generated by backend system 100, it will be crafted as if voice activated electronic device 10 was speaking from the perspective of a fan of the Zebras. In this way, backend system 100, and therefore voice activated electronic device 10, provides a much more personal and familiar response than previously provided, such as with audible message 4. As an illustrative example, responsive audio data representing response 18 may be generated, and the responsive audio data may then be provided to voice activated electronic device 10, which outputs the audible message 8, "The Zebras' are winning 15 to 10!"

In some embodiments, based on the user intent, which was determined by backend system 100, one or more interjections or expressions may also be generated for use within audible message 8. For example, in response to determining that individual 20 is a fan of the Zebras, and that based on the response information (e.g., score of the baseball game) obtained from the sports application indicating that the Zebras are winning by more than a predefined point differential, backend system 100 may generate an additional phrase, "Go Zebras'!" to be provided at an end of audible message 8. Therefore, in the illustrative example, the overall structure and substance of audio message 8 may be tailored specifically for a Zebras' fan.

Figure 2:
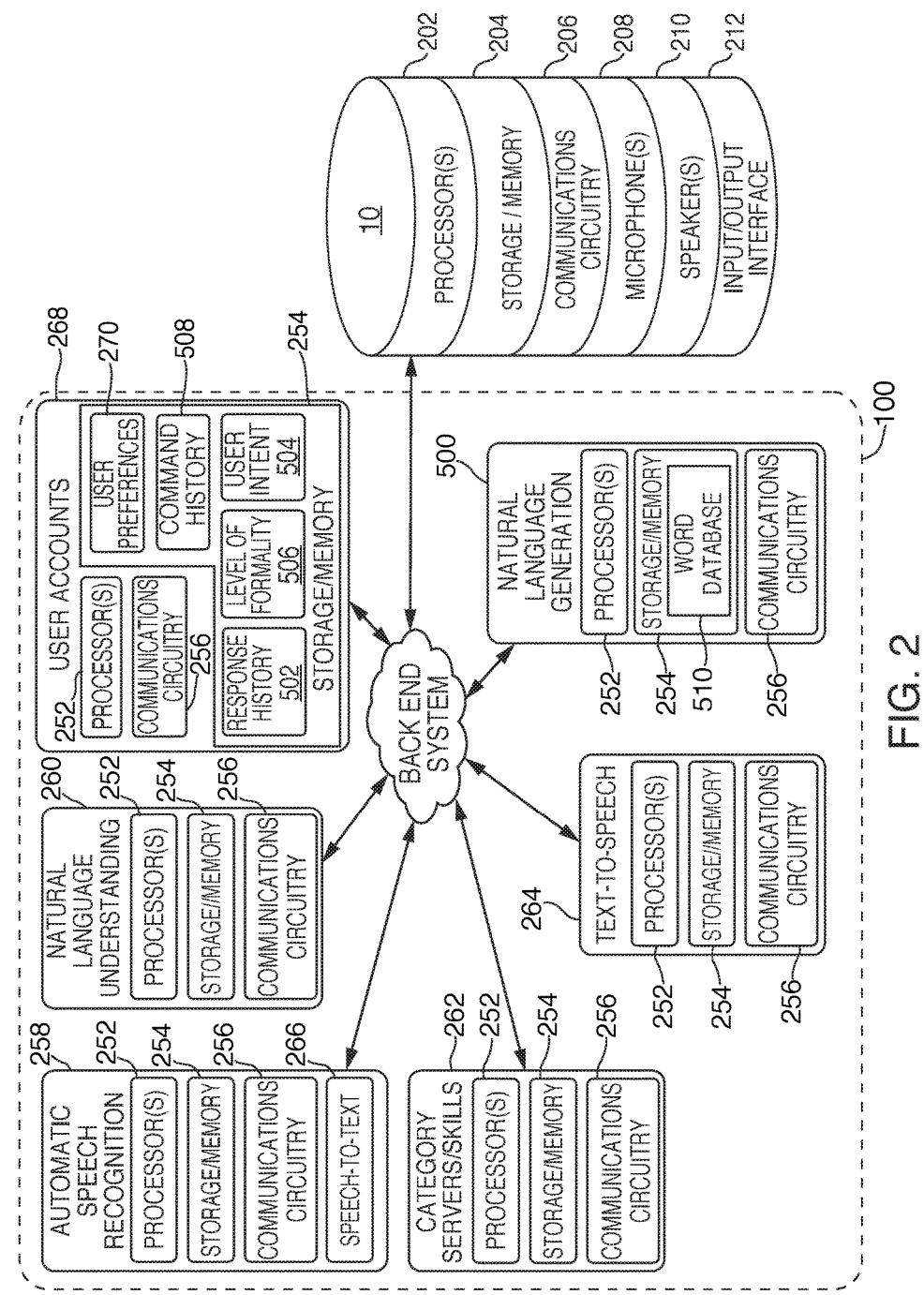
FIG. 2 is an illustrative diagram of the architecture of the system of FIG. 1, in accordance with various embodiments.

FIG. 2 is an illustrative diagram of the architecture of the system of FIG. 1, in accordance with various embodiments. Voice activated electronic device 10, in some embodiments, may correspond to any type of electronic device capable of being activated in response to detecting a specific sound. After detecting such a specific sound (e.g., a wakeword or trigger), voice activated electronic device 10 may recognize commands (e.g., audio commands, inputs) within captured audio, and may perform one or more actions in response to the received commands. Voice activated electronic device 10 may correspond to any suitable electronic device, including, but are not limited to, desktop computers, mobile computers (e.g., laptops, ultrabooks), mobile phones, smart phones, tablets, televisions, set top boxes, smart televisions, watches, bracelets, any other wearable device, display screens, personal digital assistants ("PDAs"), smart furniture, smart household devices, smart vehicles, smart transportation devices, and/or smart accessories. In some embodiments, voice activated electronic device 10 may be relatively simple or basic in structure such that no mechanical input option(s) (e.g., keyboard, mouse, trackpad) or touch input(s) (e.g., touchscreen, buttons) may be provided. For example, voice activated electronic device 10 may be able to receive and output audio, and may include power, processing capabilities, storage/memory capabilities, and communication capabilities.

Voice activated electronic device 10 may include a minimal number of input mechanisms, such as a power on/off switch, however primary functionality, in one exemplary embodiment, of voice activated electronic device 10 may solely be through audio input and audio output. For example, voice activated electronic device 10 may listen for a wakeword by continually monitoring local audio. In response to the wakeword being detected, voice activated electronic device 10 may establish a connection with backend system 100, send audio data to backend system 100, and await/receive a response from backend system 100. In some embodiments, however, non-voice activated electronic devices may also communicate with backend system 100 (e.g., push-to-talk or tap-to-talk devices). For example, electronic device 10, in one embodiment, corresponds to a manually activated electronic device, and the foregoing descriptions may be equally applicable to a non-voice activated electronic device.

Voice activated electronic device 10 may include one or more processors 202, storage/memory 204, communications circuitry 206, one or more microphones 208 or other audio input devices (e.g., transducers), one or more speakers 210 or other audio output devices, as well as an optional input/output ("I/O") interface 212. However, one or more additional components may be included within voice activated electronic device 10, and/or one or more components may be omitted. For example, voice activated electronic device 10 may include a power supply or a bus connector. As another example, voice activated electronic device 10 may not include I/O interface 212. Furthermore, while multiple instances of one or more components may be included within voice activated electronic device 10, for simplicity only one of each component has been shown within FIG. 2.

Processor(s) 202 may include any suitable processing circuitry capable of controlling operations and functionality of voice activated electronic device 10, as well as facilitating communications between various components within voice activated electronic device 10. In some embodiments, processor(s) 202 may include a central processing unit ("CPU"), a graphic processing unit ("GPU"), one or more microprocessors, a digital signal processor, or any other type of processor, or any combination thereof. In some embodiments, the functionality of processor(s) 202 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, processor(s) 202 may include its own local memory, which may store program modules, program data, and/or one or more operating systems. However, processor(s) 202 may run an operating system ("OS") for voice activated electronic device 10, and/or one or more firmware applications, media applications, and/or applications resident thereon.

Storage/memory 204 may include one or more types of storage mediums such as any volatile or non-volatile memory, or any removable or non-removable memory implemented in any suitable manner to store data on voice activated electronic device 10. For example, information may be stored using computer-readable instructions, data structures, and/or program modules. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tapes, magnetic disk storage or other magnetic storage devices, RAID storage systems, or any other storage type, or any combination thereof. Furthermore, storage/memory 204 may be implemented as computer-readable storage media ("CRSM"), which may be any available physical media accessible by processor(s) 202 to execute one or more instructions stored within storage/memory 204. In some embodiments, one or more applications (e.g., gaming, music, video, calendars, lists, etc.) may be run by processor(s) 202, and may be stored in memory 204.

In some embodiments, storage/memory 204 may include one or more modules and/or databases, such as a speech recognition module, a list of wakewords database, and/or a wakeword detection module. For example, the speech recognition module may include an automatic speech recognition ("ASR") component that recognizes human speech in detected audio. The speech recognition module may also include a natural language understanding ("NLU") component that determines user intent based on the detected audio. Also included within the speech recognition module may be a text-to-speech ("TTS") component capable of converting text to speech to be outputted by speaker(s) 210, and/or a speech-to-text ("STT") component capable of converting received audio signals into text to be sent to backend system 100 for processing.

The list of wakewords database may be a database stored locally on voice activated electronic device 10 that includes a list of a current wakeword or wakewords for voice activated electronic device 10, as well as one or more previously used, or alternative, wakewords for voice activated electronic device 10. In some embodiments, individual 20 may set or program a wakeword for voice activated electronic device 10. The wakeword may be programmed directly on voice activated electronic device 10, or a wakeword may be set by individual 20 via a backend system application resident on a user device that is in communication with backend system 100. For example, individual 20 may use their mobile device having the backend system application running thereon to set the wakeword for voice activated electronic device 10. The specific wakeword may then be communicated from their mobile device to backend system 100, which in turn may send/notify voice activated electronic device 10 of the individual's selection for the wakeword. The selected activation may then be stored within the list of wakeword database on storage/memory 204.

The wakeword detection module may include an expression detector that analyzes an audio signal produced by microphone(s) 208 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 208. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a likelihood result indicating a likelihood that the wakeword is represented within the audio signal detected by microphone(s) 208. The expression detector may then compare that likelihood result to a likelihood threshold to determine whether the wakeword will be declared as having been spoken.

In some embodiments, a keyword spotter may use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An MINI model represents a word as a series of states. Generally, a portion of an audio signal is analyzed by comparing its MINI model to an HMM model of the trigger expression, yielding a feature result that represents the similarity of the audio signal model to the trigger expression model.

In practice, an MINI recognizer may produce multiple feature results, corresponding to different features of the MINI models. An expression detector may use a support vector machine ("SVM") classifier that receives the one or more feature results produced by the HMM recognizer. The SVM classifier produces a confidence mark indicating the likelihood that an audio signal contains the trigger expression. The confidence mark is compared to a confidence threshold to make a final decision regarding whether a particular portion of the audio signal represents an utterance of the trigger expression (e.g., wakeword). Upon declaring that the audio signal represents an utterance of the trigger expression, voice activated electronic device 10 may then begin transmitting the audio signal to backend system 100 for detecting and responds to subsequent utterances made by individual 20.

Communications circuitry 206 may include any circuitry allowing or enabling voice activated electronic device 10 to communicate with one or more devices, servers, and/or systems. For example, communications circuitry 206 may facilitate communications between voice activated electronic device 10 and backend system 100 using a network, such as the Internet, or using any number of communications protocols. For example, Transfer Control Protocol and Internet Protocol ("TCP/IP") (e.g., any of the protocols used in each of the TCP/IP layers), Hypertext Transfer Protocol ("HTTP"), and wireless application protocol ("WAP"), are some of the various types of protocols that may be used to facilitate communications between voice activated electronic device 10 and backend system 100. In some embodiments, voice activated electronic device 10 and backend system 100 may communicate with one another via a web browser using HTTP. Various additional communication protocols may be used to facilitate communications between voice activated electronic device 10 and backend system 100 including, but not limited to, Wi-Fi (e.g., 802.11 protocol), Bluetooth®, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP.

Communications circuitry 206 may use any communications protocol, such as any of the previously mentioned exemplary communications protocols. In some embodiments, voice activated electronic device 10 may include an antenna to facilitate wireless communications with a network using various wireless technologies (e.g., Wi-Fi, Bluetooth®, radiofrequency, etc.). In yet another embodiment, voice activated electronic device 10 may include one or more universal serial bus ("USB") ports, one or more Ethernet or broadband ports, and/or any other type of hardwire access port so that communications circuitry 206 allows voice activated electronic device 10 to communicate with one or more communications networks.

Voice activated electronic device 10 may also include one or more microphones 208 and/or transducers. Microphone(s) 208 may be any suitable component capable of detecting audio signals. For example, microphone(s) 208 may include one or more sensors for generating electrical signals and circuitry capable of processing the generated electrical signals. In some embodiments, microphone(s) 208 may include multiple microphones capable of detecting various frequency levels. As an illustrative example, voice activated electronic device 10 may include multiple microphones (e.g., four, seven, ten, etc.) placed at various positions about voice activated electronic device 10 to monitor/capture any audio outputted in the environment where voice activated electronic device 10 is located. The various microphones 208 may include some microphones optimized for distant sounds, while some microphones may be optimized for sounds occurring within a close range of voice activated electronic device 10.

Voice activated electronic device 10 may further include one or more speakers 210. Speaker(s) 210 may correspond to any suitable mechanism for outputting audio signals. For example, speaker(s) 210 may include one or more speaker units, transducers, arrays of speakers, and/or arrays of transducers that may be capable of broadcasting audio signals and or audio content to a surrounding area where voice activated electronic device 10 may be located. In some embodiments, speaker(s) 210 may include headphones or ear buds, which may be wirelessly wired, or hard-wired, to voice activated electronic device 10, that may be capable of broadcasting audio directly to individual 20.

In some embodiments, one or more microphones 208 may serve as input devices to receive audio inputs, such as speech from individual 20. Voice activated electronic device 10, in the previously mentioned embodiment, may then also include one or more speakers 210 to output audible responses. In this manner, voice activated electronic device 10 may function solely through speech or audio, without the use or need for any input mechanisms or displays.

In one exemplary embodiment, voice activated electronic device 10 includes I/O interface 212. The input portion of I/O interface 212 may correspond to any suitable mechanism for receiving inputs from a user of voice activated electronic device 10. For example, a camera, keyboard, mouse, joystick, or external controller may be used as an input mechanism for I/O interface 212. The output portion of I/O interface 212 may correspond to any suitable mechanism for generating outputs from voice activated electronic device 10. For example, one or more displays may be used as an output mechanism for I/O interface 212. As another example, one or more lights, light emitting diodes ("LEDs"), or other visual indicator(s) may be used to output signals via I/O interface 212 of voice activated electronic device 10. In some embodiments, one or more vibrating mechanisms or other haptic features may be included with I/O interface 212 to provide a haptic response to individual 20 from voice activated electronic device 10. Persons of ordinary skill in the art will recognize that, in some embodiments, one or more features of I/O interface 212 may be included in a purely voice activated version of electronic device 10. For example, one or more LED lights may be included on voice activated electronic device 10 such that, when microphone(s) 208 receive audio from individual 20, the one or more LED lights become illuminated signifying that audio has been received by voice activated electronic device 10. In some embodiments, I/O interface 212 may include a display screen and/or touch screen, which may be any size and/or shape and may be located at any portion of voice activated electronic device 10. Various types of display screens may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display screen including capacitive sensing panels capable of recognizing touch inputs thereon.

Backend system 100 may include various components and modules including, but not limited to, automatic speech recognition ("ASR") module 258, natural language understanding ("NLU") module 260, category servers/skills module 262, text-to-speech module 264, user accounts module 268, and natural language generation module 500. In some embodiments, backend system 100 may also include computer readable media, including, but not limited to, flash memory, random access memory ("RAM"), and/or read-only memory ("ROM"). Backend system 100 may also include various modules that store software, hardware, logic, instructions, and/or commands for backend system 100, such as a speaker identification ("ID") module, or any other module, or any combination thereof.

ASR module 258 may be configured such that it recognizes human speech in detected audio, such as audio captured by voice activated electronic device 10, which is then transmitted to backend system 100. ASR module 258 may include, in one embodiment, one or more processor(s) 252, storage/memory 254, and communications circuitry 256. Processor(s) 252, storage/memory 254, and communications circuitry 256 may, in some embodiments, be substantially similar to processor(s) 202, storage/memory 204, and communications circuitry 206, which are described in greater detail above, and the aforementioned descriptions may apply. Furthermore, in some embodiments, ASR module 258 may include speech-to-text ("STT") module 266. STT module 266 may employ various speech-to-text techniques. However, techniques for transcribing speech into text are well known in the art and need not be described in further detail herein, and any suitable computer implemented speech to text technique may be used to convert the received audio signal(s) into text, such as SOFTSOUND® speech processing technologies available from the Autonomy Corporation, which is headquartered in Cambridge, England, United Kingdom.

ASR module 258 may include an expression detector that analyzes audio signals received by backend system 100. Such audio signals may, for instance, correspond to one or more words, or temporally related sounds, spoken by an individual, such as individual 20. For example, the spoken words may correspond to a question or command uttered by individual 20 (e.g., question 2). In some embodiments, ASR module 258 may also include an expression detector, which may be implemented using keyword spotting technology, as described in greater detail above.

NLU module 260 may be configured such that it determines user intent based on the received audio. For example, NLU module 260 may receive audio data 12 representing question 2. NLU module 260 may determine that the intent of question 2 is for a score of a baseball game for a particular baseball team (e.g., the Zebras). In response to determining the intent of question 2, NLU module 260 may communicate the received audio data to an appropriate category server or skill of category servers/skills module 262 to obtain response information and, in some embodiments, generate an appropriate response. NLU module 260 may include processor(s) 252, storage/memory 254, and communications circuitry 256 which, in one embodiment, are substantially similar to processor(s) 202, storage/memory 204, and communications circuitry 206 of electronic device 10, and the previous description may apply.

Category servers/skills module 262 may, in some embodiments, correspond to various action specific skills, category servers, and/or applications that are capable of processing various task specific actions. Category servers/skills module 262 may further correspond to one or more first party applications and/or third party applications capable of performing various tasks or actions, as well as providing response information for responses to user commands. For example, based on the context or user intent of audio data 12, backend system 100 may access a particular application to obtain response information from, as well as, or alternatively, generate a response, which in turn may be communicated back to electronic device 10. For example, in response to determining that the user intent of question 2 is for a score of a baseball game, a sports application may be accessed to obtain the score of the baseball game, as well as generate a response including the score of the baseball game. Category servers/skills module 262 may also include one or more instances of processor(s) 252, storage/memory 254, and communications circuitry 256, which may be substantially similar to processor(s) 252, storage/memory 254, and communications circuitry 256 of ASR module 258, and the previous descriptions may apply.

TTS module 264 may employ various text-to-speech techniques. However, techniques for transcribing speech into text are well known in the art and need not be described in further detail herein, any suitable computer implemented speech to text technique may be used to convert the received audio signal(s) into text, such as SOFTSOUND® speech processing technologies available from the Autonomy Corporation, which is headquartered in Cambridge, England, United Kingdom. TTS module 264 may also include processor(s) 252, storage/memory 254, and communications circuitry 256, which in one embodiment may be substantially similar to processor(s) 252, storage/memory 254, and communications circuitry 256 of ASR module 258, and the previous descriptions may apply.

In some embodiments, category servers/skills module 262 may further generate response information, such as responsive audio data 14 representing response message 4. For example, category servers/skills module 262 may receive the score of the baseball game for a team, such as the Zebras, and may generate text data representing a response (e.g., response message 4). Category servers/skills module 262 may then convert the text data to speech using TTS module 264 in order to generate responsive audio data 14 representing response message 4.

User accounts module 268 may store one or more user profiles corresponding to individuals having a registered account on backend system 100. User accounts module 268, in some embodiments, may be hierarchal, such that various customer accounts are stored for individual households or device identification numbers (e.g., an identification number associated with electronic device 10). For example, electronic device 10 may be associated with a particular household, and one or more additional devices may also be associated with that same household under a single customer account. In some embodiments, a customer account may further include one or more profiles. Each profile may be user specific or, in other words, associated with one particular individual. For example, a parent may have a registered account on backend system 100, and each of the parent's children may have their own user profile registered under the parent's registered account. In some embodiments, each user profile may include user-specific information, such as user specific historical information, user-specific recommendations, user-specific preferences, and/or user-specific biometric information (e.g., voice identification signatures, biometric passwords, etc.). Information, settings, and/or preferences, for example, for each user profile may be stored within user accounts module 268. In some embodiments, user accounts module 268 may store a voice signal for a specific user profile. This may allow speaker identification techniques to be used to match a voice to voice biometric data associated with a specific user profile. In some embodiments, user accounts module 268 may store a telephone number assigned to a particular user profile. When the assigned telephone number for a user profile is called, one or more actions may be performed by backend system 100, such as answering the call and providing one or more questions to be answered. The voice biometric data, telephone number, or any other user preference may, in some embodiments, be stored within a user preferences component 270 of storage/memory 254 of user accounts module 268. In some embodiments, one or more preferred teams (e.g., teams that an individual having a register user account on user accounts module 268 is a fan of), languages, dialects, or accents may also be stored within user preferences component 270. In response to generating a response to a question, for example, TTS module 264 may access user preferences component 270 of user accounts module 268 to determine a pronunciation or accent to use for words within a response to be generated. User accounts module 268 may also include processor(s) 252 and communications circuitry 256, in addition to storage/memory 254, which in some embodiments are substantially similar to processor(s) 252 and communications circuitry 256 of ASR module 258, and the previous description may apply.

In some embodiments, storage/memory 254 of user accounts module 268 may also include a response history component 502, a user intent component 504, a level of formality component 506, and a command history component 508, pertinent for each user profile stored within user accounts module 268. In some embodiments, response history component 502 is configured to store each response that has been generated by backend system 100. A response may be generated for each command (e.g., question 2) received by backend system 100. These responses may then be stored in response history component 502, along with the corresponding command that was received. For example, the response, "Zebras: 15; Cauliflowers: 10" is stored within response history component 502 along with question 2, "What is the score of the Zebras game?" In some embodiments, a pointer to the corresponding command that prompted a particular response may be stored within response history component 502. Additional information may also be logged in response history component 502 along with each response, such as a time and/or date when a response was generated, a geographical location of the requesting voice activated electronic device (e.g., voice activated electronic device 10), an associated user account, and/or any other pertinent information. In some embodiments, the response that is generated need not be a verbal response. For example, a response to a command, "Alexa—Play my music," may cause backend system 100 to provide voice activated electronic device 10 with music files to play. In this particular scenario, the instruction to play music may, therefore, be stored within response history component 502.

User intent component 504 may, in one exemplary, non-limiting embodiment, store a user intent or context of each command that is received by backend system 100. Some commands, however, may not have a verbal response generated by backend system 100. As mentioned above, individual 20 may ask voice activated electronic device 10 to play music by saying, "Alexa—play my music." In this particular scenario, no response may be generated (e.g., no speech is generated), however voice activated electronic device may begin playing music. Thus, user intent component 504 may store a user intent for this command, such as the user intent: "play music." However, if an individual, such as individual 20, asks for a score of a baseball game (e.g., question 2—"Alexa—What is the score of the Zebras' game?"), then the intent of the command may be for sports, and therefore may be stored within user intent component 504.

In some embodiments, a user intent of a received command may be determined by NLU module 260. For example, NLU module 260 may receive the generated text data from ASR module 258, and may be configured to determine whether one or more keywords are included within the text data. As one illustrative example, if an individual asks for the a weather forecast, NLU module 260 may recognize the keyword "weather" within the text data, and may determine that the individual's intent is for "weather information." As another example, an individual may ask for stock information, and NLU module 260 may recognize the keyword "stock" within the text data, and may determine that the individual's intent is for stock information. Each user intent that has been determined, in some embodiments, may be provided to user intent component 504 from NLU module 260, and user intent component 504 may store each different user intent therein.

In some embodiments, a category server or application from category servers/skills module 262 that is accessed in response to a command may be stored within user intent component 504. For example question 2 may have a user intent of "sports," and therefore backend system 100 may access a sports application, or a sports category server, to obtain response information. Thus, user intent component 504 may store that, for received question 2, the accessed category server was the sports application. This may enable backend system 100 to quickly access the same category server if it is determined that the question or command that was asked also is related to a similar subject matter (e.g., sports). In some embodiments, each category server or application from category server/skills module 262 may have a list of keywords that are associated with that particular category server/skill/application. If, within the generated text data of the command, one of those keywords is determined to be present, then NLU module 260 may identify the corresponding category server or application, and store that keyword within user intent component 504.

Level of formality component 506 may store a type or style that is to be used for a response to a command received by backend system 100. For example, depending on the wording or phrasing of the received command, the formality of the individual that made the command differs. Level of formality component 506 may, therefore, enable NLG module 500 to appropriately craft responses that include words, as well as phrases, that are more aligned with the requesting individual's style of speech. In some embodiments, level of formality component 506 may store previous formality levels used to respond to previously received commands. For example, if a previous command was responded to in an informal manner, then a future response to a similar command may also be generated using an informal tone.

In some embodiments, level of formality component 506 may store various formality levels of responses to similar commands provided by different individuals. For example, each individual that provides a command to backend system 100 may have that command logged. A style of each of the provided commands may then be determined by backend system 100. In this way, a common formality style appropriate for responses to a particular command may be determined and this information may be used for responding to a currently asked command. Furthermore, level of formality component 506 may also access command history component 508 to determine if a previously received command is substantially similar to a current command that a response is being generated for. For example, individual 20 may ask question 6 to voice activated electronic device 10, which may be substantially similar to previously asked question 2. Thus, NLG module 500 may determine common features present between various commands. For example, NLG module 500 may determine that, based on the context of both questions 2 and 6 that individual 20 is a fan of the team: "The Zebras," because both questions 2 and 6 asked for the score of the Zebras' game. Thus, a response to question 6 may be formatted or arranged such that the response is tailored for a fan of the Zebras (e.g., the Zebras are winning, the Zebras are destroying, the Zebras are trailing, etc.). Similarly, the level of formality may be based on previous responses to commands stored within response history component 502. For example, if a previous response to a similar command used an informal tone, then a current response may also use an informal tone.

In some embodiments, level of formality component 506 may also store language and/or dialect information for use in the response generation. For example, based on geographic information obtained with the audio data received by backend system 100, a language that is associated with the particular geographic region may be determined so as to formulate a response in the language of that geographic region. Similarly, a dialect for a particular geographic region may also be determined based on geographic information obtained by backend system 100.

Command history component 508, in an illustrative embodiment, may be configured to store previous commands that were received by backend system 100 from voice activated electronic device 10. Command history component 508 may store text data representing the spoken command (e.g., post speech to text processing), and/or audio data representing the spoken command. In addition to storing the command's text and/or audio data, geographic information, or any other suitable metadata (e.g., time, date, device type, voice biometric data) may also be received with the audio data representing the command by backend system 100. This additional metadata may also be stored within command history component 508 such that, when formulating a response to the command, the metadata may be harnessed to generate a response tailored for a particular individual that made the request.

In some embodiments, backend system 100 may dynamically update, modify, add, and/or delete one or more user preferences based on an individual's (e.g., individual 20) interactions with voice activated electronic device 10 and backend system 100. For example, in response to determining that individual 20 has asked for the score of a baseball game multiple times within a finite temporal window (e.g., a few minutes), a preference for a particular team, such as the Zebras, may be stored within user preferences component 270. In this way, future responses to questions or commands related to a same or similar user intent (e.g., score of the Zebras' game) may be tailored to that of a fan of that team.

Natural language generation ("NLG") module 500, in some embodiments, generates responses to commands received by backend system 100, such that the responses have a natural feel and include words and/or phrases specifically formatted for a requesting individual. As opposed to using templates to formulate responses, NLG module 500 may include models trained from the various templates for forming responses. Furthermore, NLG module 500 may include a word database 510, a phrase database 512 (shown in FIG. 5), and a word/phrase arrangement component 514 (shown in FIG. 5). Word database 510, in some embodiments, may include individual words representative of a language associated with individual 20. For example, NLG module 500 may analyze transcripts of local news programs, television shows, sporting events, or any other media program to obtain common components of language relevant to individual 20, as well as a region that individual 20 is located. As one illustrative example, NLG module 500 may analyze a transcription of a regional sports program to determine commonly used words or phrases for describing scores or other sporting news for a particular region. These words and/or phrases may then be stored within word database 510 for use when a response to a command is being generated.

In some embodiments, category servers/skills module 262 may access NLG module 500 when forming a response to a question, such as question 2. NLG module 500 may receive, as inputs for generating a response to a command, response information obtained from category servers/skills module 262, as well as information obtained from one or more of response history component 502, user intent component 504, level of formality component 506, and command history component 508. In some embodiments, NLG module 500 may receive response information from category servers/skills module 262, and based on one or more user preferences stored within user preference component 270, may select a set of words from word database 510 with which to use for generating a response. In this particular scenario, the appropriate arrangement of the words from the selected set of words may be determined by NLG module 500, which then generates the responses and provides the response to TTS module 264 prior to being transmitted back to voice activated electronic device 10. In some embodiments, however, NLG module 500 may itself include TTS module 264 therein, or text-to-speech functionality, such that responses, and responsive audio data representing the response, is generated by NLG module 500. NLG module 500 may include processor(s) 252 and communications circuitry 256, in addition to storage/memory 254, which in some embodiments are substantially similar to processor(s) 252, and communications circuitry 256, and storage/memory 254 of ASR module 258, respectively, and the previous descriptions may apply.

Persons of ordinary skill in the art will recognize that although each of ASR module 258, NLU module 260, category servers/skills module 262, TTS module 264, user accounts module 268, and NLG module 500 may each include instances of processor(s) 252, storage/memory 254, and communications circuitry 256, and those instances of processor(s) 252, storage/memory 254, and communications circuitry 256 within each of ASR module 258, NLU module 260, skills module 262, TTS module 264, user accounts module 268, and NLG module 500 may differ. For example, the structure, functionality, and style of processor(s) 252 within ASR module 258 may be substantially similar to the structure, functionality, and style of processor(s) 252 within NLU module 260, however the actual processor(s) 252 need not be the same component.

After individual 20 ask a question, such as question 2 or 6 of FIG. 1, which is directed to voice activated electronic device 10, voice activated electronic device 10 may record the audio of the speech, and the audio data representing the speech may be sent to backend system 100. Upon receipt of the audio data, backend system 100 may perform automated speech recognition functionality on the audio data. For example, ASR module 258 on backend system 100 may initially be provided with the audio data. Speech to text processing, which is performed by STT module 266, thus generates text data representing the speech from the audio data provided to backend system 100.

After automated speech recognition occurs, natural language understanding functionality may be performed to the text data. For example, NLU module 260 may analyze the text data obtained to determine an individual's user intent for the speech that was provided. The intent may correspond to a subject matter or context of the speech. In some embodiments, one or more category specific words or phrases may be recognized by NLU module 260 that represent a specific subject matter or context of the speech. For example, the subject matter of the speech, "What is the weather currently like?" provided by individual 2 may correspond to "weather." Furthermore, a corresponding application from skills module 262 with which a response, or response information, may be obtained for the speech may be determined. Continuing the previous example, in response to determining that the subject matter corresponds to "weather," NLU module 260 may be determine that a weather category server or weather application of category servers/skills module 262 is to be accessed to obtain the current weather information.

NLG module 500 may generate a response based on one or more response templates. Further continuing the example above, NLG module 500 may select a template in response to the question, "What is the weather currently like?" of the form: "The weather currently is $weather_information$." NLG module 500 may analyze the logical form of the template to produce one or more textual responses including markups and annotations to familiarize the response that is generated. In some embodiments, NLG module 500 may determine which response is the most appropriate response to be selected. The selection may, therefore, be based on past responses, past questions, a level of formality, and/or any other feature, or any other combination thereof. Responsive audio data representing the response generated by NLG module 500 may then be generated using TTS module 264. After the responsive audio data is generated, the responsive audio data is then provided back to voice activated electronic device 10. Voice activated electronic device 10 may then output the audio, for instance using speaker(s) 210, which may be received by individual 20.

Figure 3:
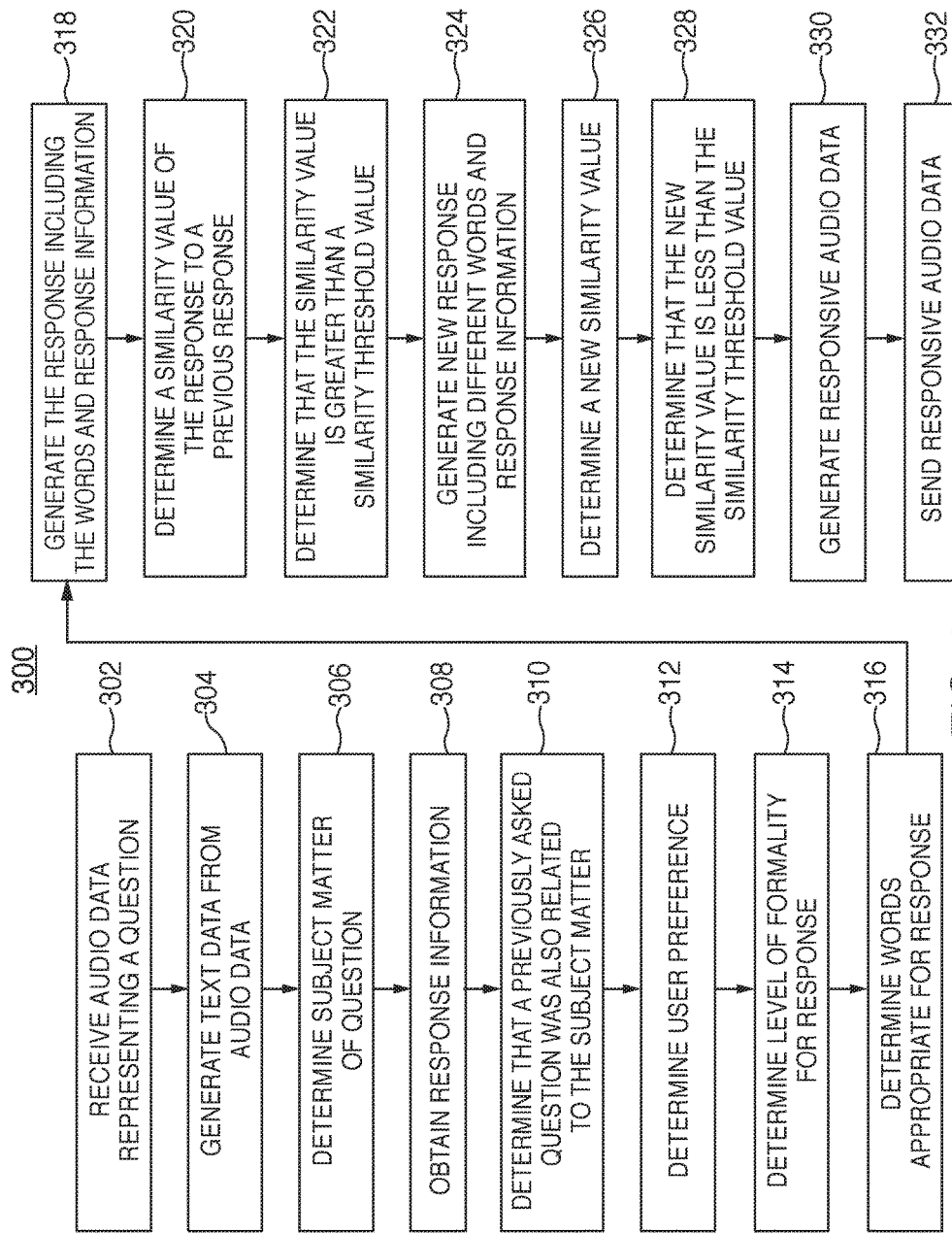
FIG. 3 is an illustrative flowchart of a process for providing responses to an individual, in accordance with various embodiments.

FIG. 3 is an illustrative flowchart of a process for providing responses to an individual, in accordance with various embodiments. Process 300, in one exemplary, non-limiting embodiment, may begin at step 302. At step 302, audio data representing a question may be received by backend system 100. For example, individual 20 may ask question 6 to their voice activated electronic device 10. In response to detecting a wakeword (e.g., "Alexa"), voice activated electronic device 10 may begin to record audio using microphone(s) 208. The recorded audio may include, for instance, some or all of question 6 (e.g., "Alexa—What is the score of the Zebras' game now?" or "What is the score of the Zebras' game now?"). Upon completion of the audio being recorded, audio data representing the question may be provided to backend system 100. In some embodiments, temporal metadata, such as a time/date of when the question was detected by voice activated electronic device 10 may also be received by backend system with the audio data. For example, a time that question 6 was detected by voice activated electronic device 10 may be provided with audio data 16 to backend system 100.

At step 304, text data may be generated from the audio data by executing speech to text functionality on the received audio data. For example, the received audio data may be provided to ASR module 258, which in turn may execute speech to text functionality using STT module 266 located thereon. The text data may then be provided to NLU module 260 to determine a user intent, or context, of the question.

At step 306, a subject matter that the question is related to may be determined by NLU module 260. For example, a determination may be made that question 6 asks for the score of a game for a team. NLU module 260 may also determine that the intent or context of the question. For example, NLU module 260 may determine, from the text data, that question 6 is asking for a score of the baseball game associated with the baseball team, the Zebras. NLU module 260 may further determine, based on the user intent, an application with which the subject matter is related. For instance, the context of question 2 may be baseball scores, or more generally sports. Therefore, NLU module 260 may, at step 308, obtain response information from an appropriate category server/application, such as a score of the game from a sports application located within category servers/skills module 262 on backend system 100. As an illustrative example, the sports application may include dynamically updated sports news and information, including, but not limited to, scores of games, highlight materials, and player information. Thus, in response to determining that the received question is for a score of a particular team (e.g., the Zebras), the current score of the Zebras' baseball game may be retrieved from the sports application.

At step 310, a determination may be made that the previously asked question, or a previously asked question, also was also related to the same subject matter. For example, question 2, which was previously asked by individual 20, may also have been an inquiry about the score of the Zebras' baseball game. Therefore, both question 6 and previously asked question 2 were related to a same context (e.g., score of Zebras' game). In some embodiments, NLG module 500 may determine whether or not the current question is substantially similar to a previously asked question by comparing the text data representing the current question to the text data of previously asked questions that is stored within user accounts module 268. For example, a similarity value may be determined comparing the current question with a previous question to see how similar to two questions are. As mentioned previously, command history 508 for individual 20 having a user account on user accounts module 268 may be store each command previously provided by individual 20. In some embodiments, a determined user intent of the current question may first be compared to all of the previously asked questions stored therein to determine which previously asked questions are related to the current question's intent. For example, if the current intent is "sports," then any previously asked questions that are not related to sports may not be analyzed for commonality. In some embodiments, each word of the current question may be compared with each word of the previously asked questions to determine if there are any matches, and a similarity value may be determined. If a previous question and a current question, for instance, have a similarity value greater than a predefined similarity question threshold value, then the two questions may be said to be the same. For example, a match between two questions may be present if the similarity question value between the current question and a previously asked question is greater than 90%, indicating that 90% of the words included in the current question are the same as the words in the previous response of the same words. However, persons of ordinary skill in the art will recognize that any suitable technique for comparing a current question or command against one or more previously asked questions or commands may be employed, and the aforementioned is merely exemplary. In some embodiments, only questions or commands that have been asked within a certain temporal window may be analyzed for commonality. For example, question 2 may have been asked at 2:00 PM, and question 6 may have been asked at 2:15 PM on the same day. In this scenario, because the two questions were asked within 15 minutes of one another, they may be compared for similar words and intents. However, if question 2 was instead asked at 2:00 PM from one year ago, this question may not be used as a comparison for question 6.

At step 312, a user preference may be determined. In some embodiments, the subject matter of the current question may be determined to be the same as the subject matter of a previously asked question, and therefore a user may have a preference for that subject matter. For example, in response to determining that a current question is for a score of the Zebras' game, and that a previously asked question was also for the score of the Zebras' game, a determination may be made that the individual has a preference for the Zebras. In other words, because individual 20 has asked multiple times for the score of the Zebras' game, it may be determined that individual 20 is a fan of the Zebras. In some embodiments, the user preference may be stored within user preferences module 270 for future reference by backend system 100. However, in order to log a particular feature as a user preference, any suitable number of iterations of that preference being included within a command spoken by the individual may be employed, and the comparison of the current question and a single previous question is merely exemplary.

At step 314, a level of formality for a response to the question that was asked may be determined. In some embodiments, the level of formality may be determined based on geographic metadata received by backend system 100 from voice activated electronic device 10 with the audio data representing the question. For example, an IP address of voice activated electronic device 10 may be sent to backend system 100 along with audio data 16 representing question 6. The IP address may indicate a particular geographic location where voice activated electronic device 10 is located. Based on the geographic location, a language associated with that geographic location may be determined. For example, if the geographic location corresponds to Seattle, Wash., United States, a language associated with that location may be English. In some embodiments, NLG module 500 may further include, within storage/memory 254, word database 510, which stores words and phrases for one or more languages with which backend system 100 may understand. Storage/memory 254 may, therefore, include a language database for each language with which communications between backend system 100 and voice activated electronic device 10 may occur, and word database 510 may correspond to words that are associated with the particular language database for that geographic location. For example, NLG module 500 may include a language database for English and a language database for German. In this particular scenario, if the language for a particular geographic region is determined to be English, the corresponding word database 510 including words and phrases in English, may be selected with which to use for selecting words for a response to the command.

In some embodiments, determining the level of formality may also include determining a dialect associated with a particular geographic location. Different regions within a country, state, or even city may have different dialects and accents with which individuals from those regions speak. In response to determining the geographic location, the dialect for that region may also be determined. The dialect may indicate a pronunciation of various words or phrases from word database 510, and the pronunciation may also determine an order of the words that are selected from word database 510 for the response. For example, if an IP address for voice activated electronic device 10 is associated with the New York City region, the pronunciation and ordering of words for a response may differ than the pronunciation and ordering of words for a response if voice activated electronic device 10 has an IP address associated with Atlanta, Ga. region.

At step 316, words that are appropriate for the response may be determined. In some embodiments, the words may be selected based on the level of formality. For example, words associated with the English language for the dialect of the Northwest, United States, may be appropriate for a response to a question received from a voice activated electronic device 10 having an IP address associated with the Seattle, Wash. region. In some embodiments, the words that are deemed to be appropriate may be based on a particular user with whom spoke the command. For example, upon receipt of audio data 16 representing question 6, voice identification may be performed to determine if the voice used to speak question 6 matches any voice biometric data stored within user accounts module 268. If so, the corresponding user account may indicate an age of the individual that spoke question 6, thereby identifying appropriate words to be used within a response to question 6 based on the individual's age. For example, if the words used for a response to a question of individual 20 are determined to be associated with young child, then the words used for a response to a question from a parent or adult may differ.

At step 318, a response may be generated using the words that were determined to be appropriate for the response, as well as the response information. In some embodiments, one or more words may be selected by NLG module 500 based on the determined user intent or context of the question. For example, a score received from a sports application may be provided to NLG module 500 for inclusion within the response. Furthermore, an ordering or arrangement of the selected words may be determined. The ordering or arrangement may be based on various training models for responding to commands stored within storage/memory 254 of NLG module 500. For example, a sports response model may be developed based on typical speech patterns of local sports news programs, and therefore the ordering of the words may be chosen to conform with these typical speech patterns.

At step 320, a similarity value of the response to a previously generated response may be determined. The similarity value, in some embodiments, may compare each word within two or more responses to determine if they are the substantially the same. If two responses have a similarity value greater than a predefined similarity threshold value, then those two responses may be said to be similar. In some embodiments, after the response is generated, the words, and the ordering of the words, may be compared with previously generated responses stored in response history component 502 within user accounts module 268. In some embodiments, the similarity value of a current response and another response that was generated within a certain amount of time of one another (e.g., within a temporal window) may be determined. For example, responsive audio data 14 may have been generated at time 2:01 PM, while responsive audio data 18 may be generated at time 2:16 PM. A similarity value comparing responsive audio data 18 to responsive audio data 14 may be determined because the two responses were generated within a certain amount of time of one another (e.g., less than one hour). In some embodiments, the response information may change between the time of the current response was generated and a previous response was generated. Thus, in this particular scenario, the response information may not be included when determining the similarity value between two responses. For instance, the score may change between when the question 2 was asked and when question 6 was asked, and therefore the score may not be included in the similarity score determination.

At step 322, it may be determined that the similarity value is greater than a similarity threshold value. In some embodiments, this may cause NLG module 500 to determine that the current response is a repeat, and, at step 324, a new response may be generated. The new response may include, in one embodiment, one or more different words and the response information. In some embodiments, NLG module 500 may replace some words from the previous response (e.g., the response generated at step 318) with other words that were also determined to be appropriate for use within the response, but that were not used. In another embodiment, NLG module 500 may generate a completely different response, having a different sentence structure, different words, and/or a different arrangement of different or the same words.

At step 326, a new similarity value between the new response and one or more previously generated responses may be determined. In some embodiments, the newly generated response may be compared with one or more previously generated responses to ensure that no other responses that have previously been generated include the same, or substantially the same, words or the same, or substantially the same, ordering of words, that the new response includes.

At step 328, a determination may be made that the new similarity value is less than the similarity threshold value. Therefore, the new response may be said to be sufficiently different from one or more of the previously generated responses. After the new response has been determined to be unique at step 328, process 300 proceeds to step 330 where responsive audio data representing the new response may be generated. For example, the new response may be provided to TTS module 264 to generate the response audio data representing the new response. At step 332, the responsive audio data may be sent from backend system 100 to voice activated electronic device 10. As an illustrative example, responsive audio data 18 may be generated by backend system 100, and then may be provided to voice activated electronic device 10, which outputs audible message 8, "The Zebras are winning 15 to 10!"

Figure 4:
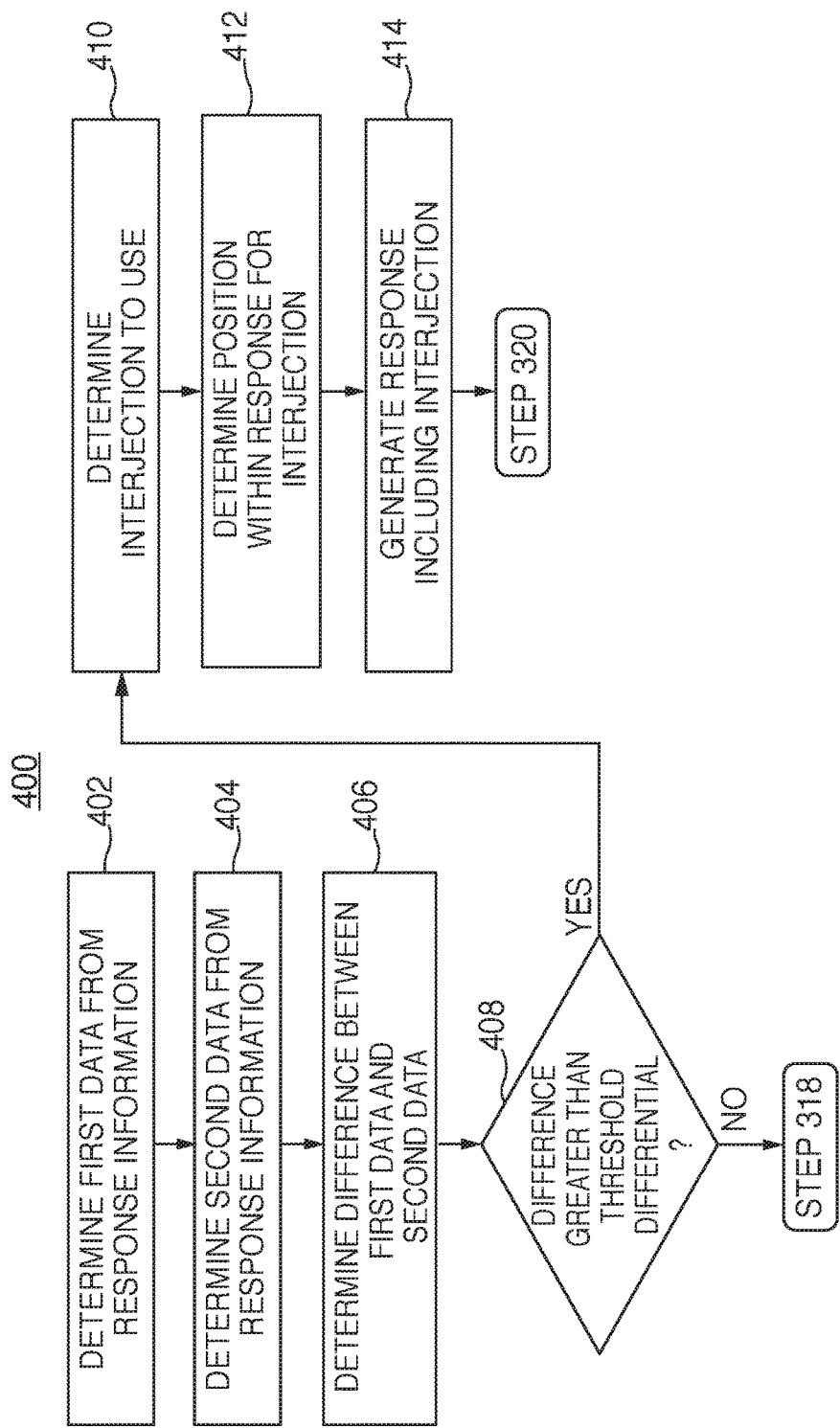
FIG. 4 is an illustrative flowchart of a process for providing an interjection for a response, in accordance with various embodiments.

FIG. 4 is an illustrative flowchart of a process for providing an interjection for a response, in accordance with various embodiments. Process 400 may begin at step 402. At step 402, first data from the response information obtained at step 308 of process 300 may be determined. For example, a score of a first team may be determined from the score of the baseball game obtained from a sports category server or sports application. At step 404, second data from the response information may be determined. For example, a score of a second team may be determined from the score of the baseball game. Persons of ordinary skill in the art will recognize that the user of sports scores, as described herein, is merely exemplary. For example, the information may be weather information, stock information, movie time information, train schedule information, recipe information, or any other information that may be obtained in response to a received command.

At step 408, a determination may be made as to whether or not the difference between the first data and the second data is greater than a threshold differential. For example, a determination may be made as to whether or not the difference between the first team's score and the second team's score is greater than a predefined threshold point differential. As an illustrative example, the predefined threshold point differential may correspond to any suitable number, such as 1 point, 5 points, 10 points, etc. In some embodiments, individual 20 may set the predefined threshold point differential. If, at step 408, it is determined that the difference is less than or equal to the threshold differential, the process 400 may proceed to step 318 of process 300, where a response is generated. For example, if the difference between the first team's score and the second team's score is less than the threshold point differential, such as 2 points, then process 400 may proceed to step 318, and no interjection may be included within the generated response.

If, however, at step 408, it is determined that the difference between the first data and the second data is greater than the threshold differential, the process 400 may proceed to step 410. For example, if the difference between the first team's score and the second team's score is greater than the threshold point differential, then process 400 may proceed to step 410. At step 410, an interjection to be used within the response may be determined. An interjection, as used herein, may be any word or phrase that may be included within a response for the purpose of providing the requesting individual with an improved user experience. For example, if one were speaking with a friend and asked for the score of the game, the individual's friend may include an interjection, "Go Zebras!" with the response, "The Zebras are winning, 15-10!" Thus, in this particular exemplary embodiment, if the point differential is determined to be large enough, NLG module 500 may be instructed to provide an interjection to be used with the response that will be generated. In some embodiments, an instruction to raise the volume of the output audio message (e.g., audible message 8) may be provided based on the determined interjection.

At step 412, a position within the response for the interjection may be determined. In some embodiments, the interjection may go at the end of the response, while in other embodiments the interjection may precede the response. However, persons of ordinary skill in the art will recognize that any suitable positioning of the interjection may be employed. At step 414, the response may be generated including the interjection placed at the appropriate position within the response, at which point process 400 may return to step 320 of process 300, to make sure that the response is unique.

Although embodiments for process 400 generally relate to using interjections for an exemplary scenario where the question is related to a score of a baseball game, the addition of an interjection into a response may be generally applicable to any suitable response to a question. The specific nature with which an interjection would be used may vary. For example, if an individual asks for the weather forecast, and it is determined to be warm and sunny, an interjection may be selected that, such as "It is beautiful outside today." Thus, the conditions for when an interjection may be used may vary depending on the conditions of the response and question. Furthermore, the interjection that may be used will vary depending on the response and question, and the aforementioned is merely one illustrative example for using interjections with a response to a question.

Furthermore, different interjections may be provided depending on different characteristics of the response information. For example, a different interjection may be used if the difference between the team's score and the opposing team's score is less than a certain threshold point differential. In this case, for instance, if the score is: Zebras: 5; Cauliflowers: 4, an interjection of the form, "It's a close one!" may be provided along with the score, signifying that the two teams have a close score.

Figure 5:
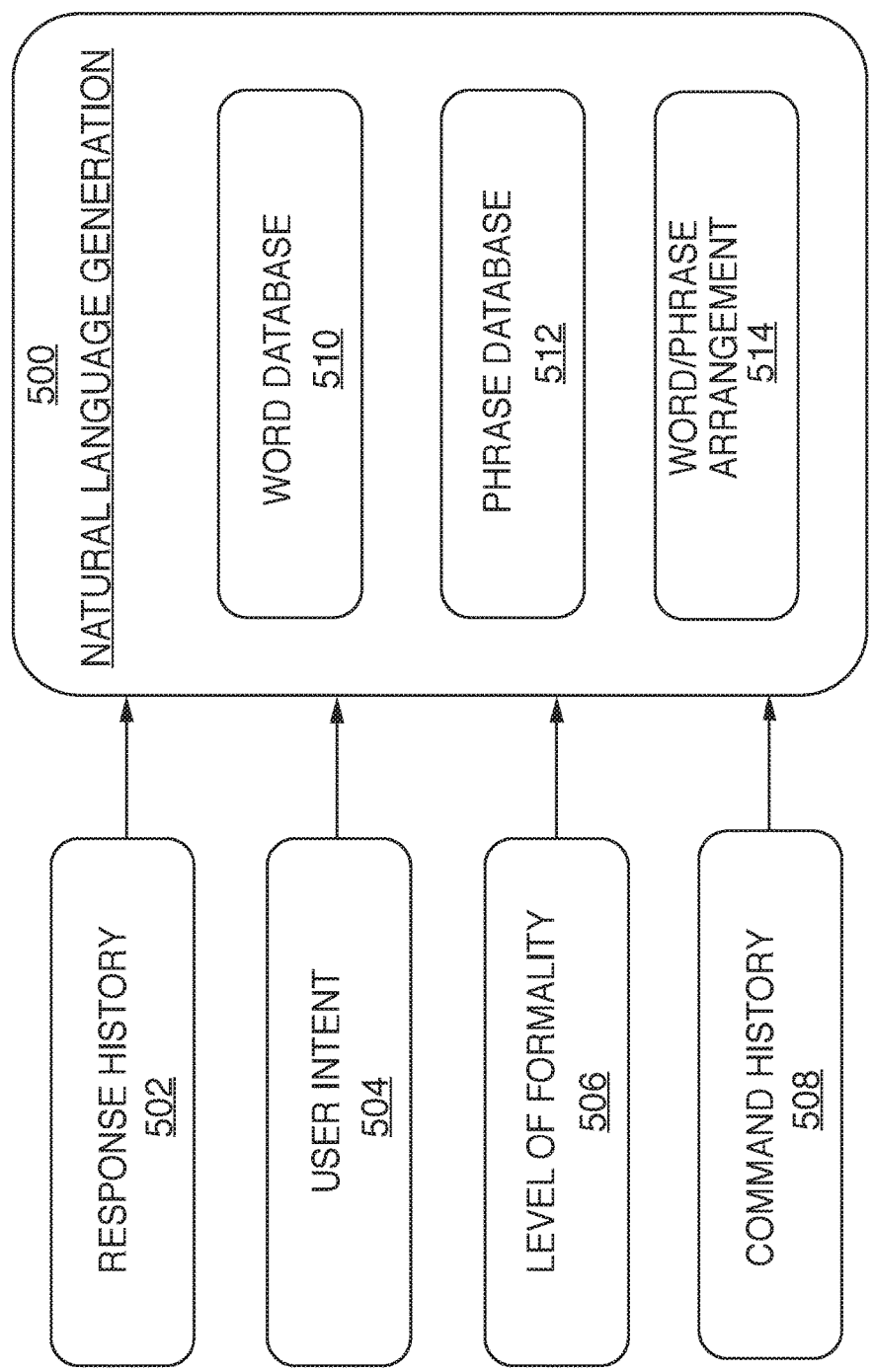
FIG. 5 is an illustrative block diagram of a natural language generation module employed within a backend system, in accordance with various embodiments.

FIG. 5 is an illustrative block diagram of a natural language generation module employed within a backend system, in accordance with various embodiments. Natural language generation module 500, in some embodiments, may include word database 510, phrase database 512, and word/phrase arrangement component 514. However, persons of ordinary skill in the art will recognize that one or more of word database 510, phrase database 512, and word/phrase arrangement component 514 may be combined or omitted, and one or more additional components or databases, such as response history component 502, user intent component 504, level of formality component 506, command history 508, may be added, and the aforementioned are merely exemplary.

In some embodiments, response history component 502, user intent component 504, level of formality component 506, and command history component 508 may each serve as an input to NLG module 500. For example, the different responses that have been previously generated may be used by NLG module 500 such that NLG module 500 is able to craft a new and unique response to each and every command. In some embodiments, one or more additional inputs may also be used by NLG module 500. For example, response information received from a selected one or more category servers/skills/applications of category servers/skills module 262 may be used as an input for NLG module 500. As another example, NLU module 260 may determine a user intent of a received command, and may provide the user intent to user intent component 504, or directly to NLG module 500. Furthermore, any suitable number of inputs may be used by NLG module 500, and the aforementioned are merely exemplary.

In some embodiments, word database 510 may store words that may be used to formulate a response to a received command. Word database 510 may be populated with words based on various models for responses to commands. For example, a transcription of a news program may be analyzed to determine common words used for different geographic regions. These words, in essence, are the building blocks of speech typically used within a particular geographic location. Word database 510, in one embodiment, stores all of the words commonly used for each different geographic location. For example, word database 510 may store English words, German words, French words, or words corresponding to any other language. In response to determining a particular geographic location or dialect associated with a command (e.g., based on an IP address of voice activated electronic device 10), a set of words for that geographic location may be selected, with which one or more words may be used to generate a response to the command from. In some embodiments, however, a particular set of words associated with an individual's user account on backend system 100 may be included within word database 510. Thus, the words used to generate a response to a command (e.g., question 2) may be selected from this smaller set of words.

Phrase database 512, in one embodiment, may be used in conjunction with word database 510 to generate a response to a command. Phrase database 512, in an exemplary embodiment, may store common phrases (e.g., groupings of words) used by a particular language or dialect associated with a particular geographic location. Based on the training models used to populate word database 510, certain groupings or pairings of words commonly used by individuals from that geographic location may be determined, and then stored within phrase database 512. As one illustrative example, the term "y'all" may be linked to one or more particular geographic locations as a way of expressing two words, "you" and "all," together. However, persons of ordinary skill in the art will recognize that phrase database 512 may function separately from word database 510, such that common phrases are stored directly within phrase database 512.

Word/phrase arrangement component 514, in some embodiments, stores orderings of words for response. Thus, when a new response to a command is generated by NLG module 500, the arrangement of the words within the new response may be compared with previous arrangements of words generated by NLG module 500 to determine if the new response is the same, or substantially the same, as any previous responses. If so, word/phrase arrangement component 514 may flag the new response as being similar to a previous response such that one or more modifications to the words or ordering of the words within the response may be made. In this way, each response from NLG module 500 should be unique and different. However, it is also possible that one or more responses may be substantially similar, and any requirement to have each response be essentially unique need not be present at all times. Furthermore, word/phrase arrangement component 514 may store common phrasing of words used from different geographical locations, based on speech pattern models of that particular area.

Figure 6:
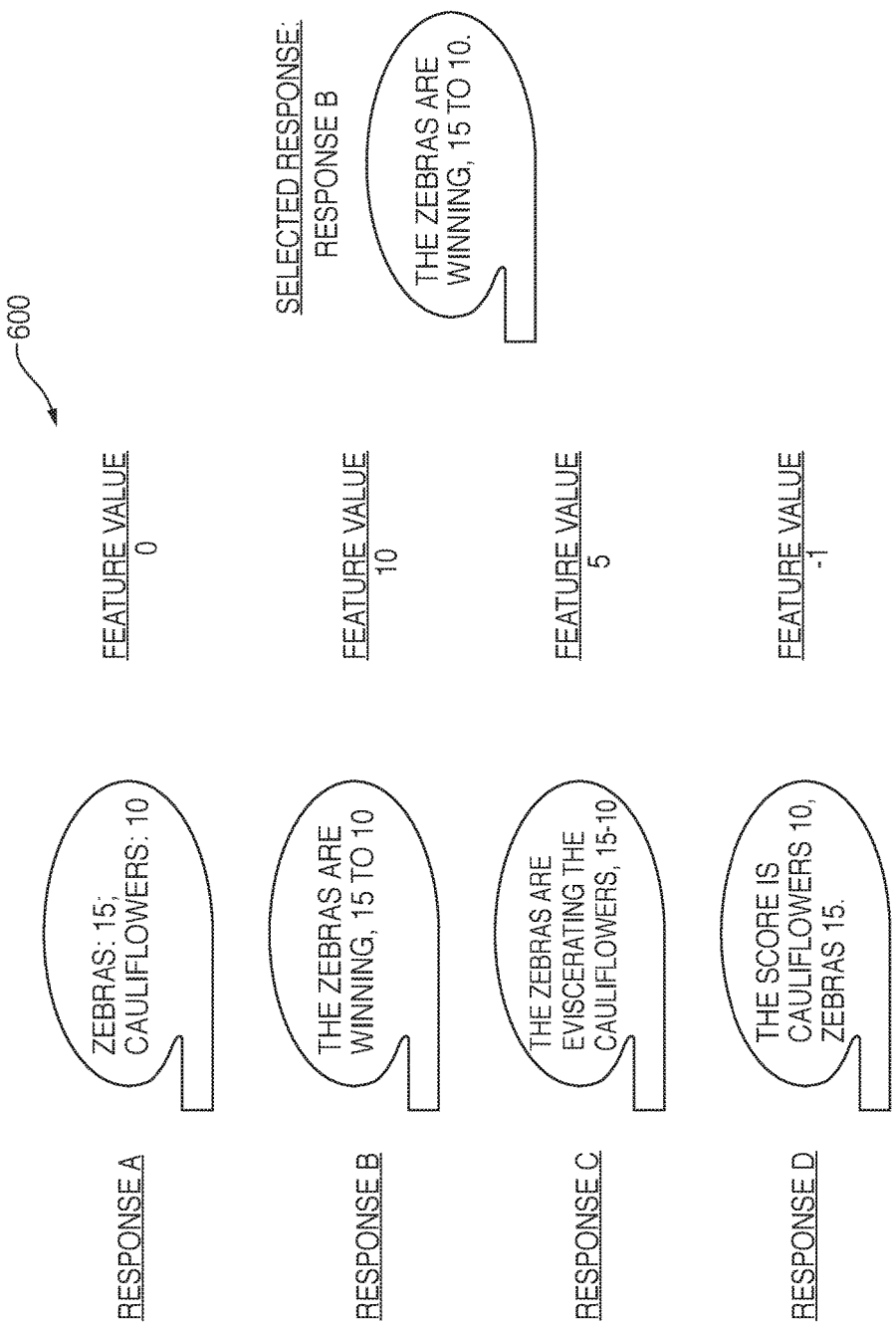
FIG. 6 is an illustrative diagram for selecting a response based on a value, in accordance with various embodiments.

FIG. 6 is an illustrative diagram for selecting a response based on a feature value, in accordance with various embodiments. Scenario 600, in the illustrative, non-limiting embodiment, includes four responses to question 6 of FIG. 1: Response A, Response B, Response C, and Response D. Although only four responses are shown within scenario 600, persons of ordinary skill in the art will recognize that any number of responses may be generated by backend system 100 with which a selection of one of the responses is to be made, and the aforementioned is merely exemplary. Furthermore, in some embodiments, Responses A-D may be generated in parallel (e.g., all at a substantially same time) or serially (e.g., one at a time).

A feature value, as described herein, may be determined using any suitable metric or set of metrics. In some embodiments, the feature value may be determined based on one or more of: a response history, a command history, a user intent, and/or a level of formality. Furthermore, in one embodiment, the various inputs to natural language generation module 500, such as response history component 502, user intent component 504, level of formality component 506, and command history component 508 may each be weighted such that one or more of response history component 502, user intent component 504, level of formality component 506, and command history component 508 may be affect the feature value more or less. For example, response history component 502 may be weighted more heavily than command history component 508 such that a generated response that matches a previously generated response less likely to be selected.

Response A—"Zebras: 15; Cauliflowers: 10"—may correspond to a neutral response where the response information (e.g., the score of each team), is merely recited. In this particular scenario, little or no weight is given to past responses or past questions. For example, Response A is substantially similar to audible message 4 provided to individual 20 after question 2 was asked. In some embodiments, a neutral response that does not account for any past responses or past commands may obtain a feature value of 0. For example, because message 4 and response A are substantially similar, a low value may be given to the response history input of the feature value such that it negatives any other factor of the feature value score. However, the feature value for a generated response may be calculated in any suitable fashion. For example, responses that are the same, or substantially similar, as previously generated responses may be weighted lower than responses that are new or different.

Response B—"The Zebras are winning, 15 to 10"—may correspond to a response that is formatted based on a determined user preference. For example, Response B may be arranged for a fan of the team the Zebras. For instance, the subject of Response B is the Zebras, and the score of the game is recited within Response B with the Zebras' score first. Response B may be generated based on a past history of commands provided by individual 20 and/or a past history of responses generated by backend system 100. As an illustrative example, because question 6 is substantially similar to question 2, NLG module 500 may be able to access past commands via command history 508 to determine that individual 20 has previously asked a substantially similar question to that of question 6. In some embodiments, NLG module 500 may further determine that the previously asked question not only is substantially similar a previously asked question, but that the previously asked question was asked within a particular temporal window of the current question (e.g., within the last hour). NLG module 500 may, therefore, be able to obtain the previous response provided to individual 20 (e.g., response 14), and may generate a new response (e.g., Response B) that differs from the previous response. As an example, the feature value for Response B may be 10. This may be because Response B differs from each previously generated response (e.g., response 14). Furthermore, Response B may obtain a higher feature value than Response A because Response B harnesses a determined user preference. For example, Response B may be generated from the perspective of a fan of the team, the Zebras, as individual 20 has asked multiple times for the score of the Zebras' game, indicating that individual 20 is in fact a fan of the Zebras.

Response C—"The Zebras are eviscerating the Cauliflowers, 15-10"—may include many similar characteristics of Response B, with the exception that the level of formality of Response C may be too informal. Having a response that is too informal, or too formal, may negatively impact the feature value of a response. For instance, the feature value of Response C may be a 5. This may due to the level of formality of Response C being too informal because it may use language that is too informal for the requesting individual. For example, individual 20 may view Response C, and may feel that the use of the term "eviscerating" is too informal, and instead may prefer a different, more formal word to indicate that the team, the Zebras, is winning.

Response D—"The score is Cauliflowers 10, Zebras 15"—may have a negative, or low, feature value, such as −1, because Response D is formulated from a neutral perspective, without any reference to a user preference. For example, Response D may be generated such that it does not indicate that any particular team is winning or losing, and merely provides a recitation of the score. Thus, Response D, in this example, provides no reflection of the apparent fandom of individual 20 to the Zebras is employed. Response D, for instance, may be generated from the perspective of a fan of "The Cauliflowers," not "The Zebras." Response D, as another example, may be generated such that the score is provided in alphabetical order of the teams.

In some embodiments, NLG module 500 may select a response having a highest feature value to be provided to voice activated electronic device 10. In this particular example, Response B may have the highest feature value (e.g., a feature value of 10), and therefore Response B may be selected. The selected response may then be provided to TTS module 264, which in turn generates audio data representing response 18, and provides the responsive audio data to voice activated electronic device 10.

Figure 7:
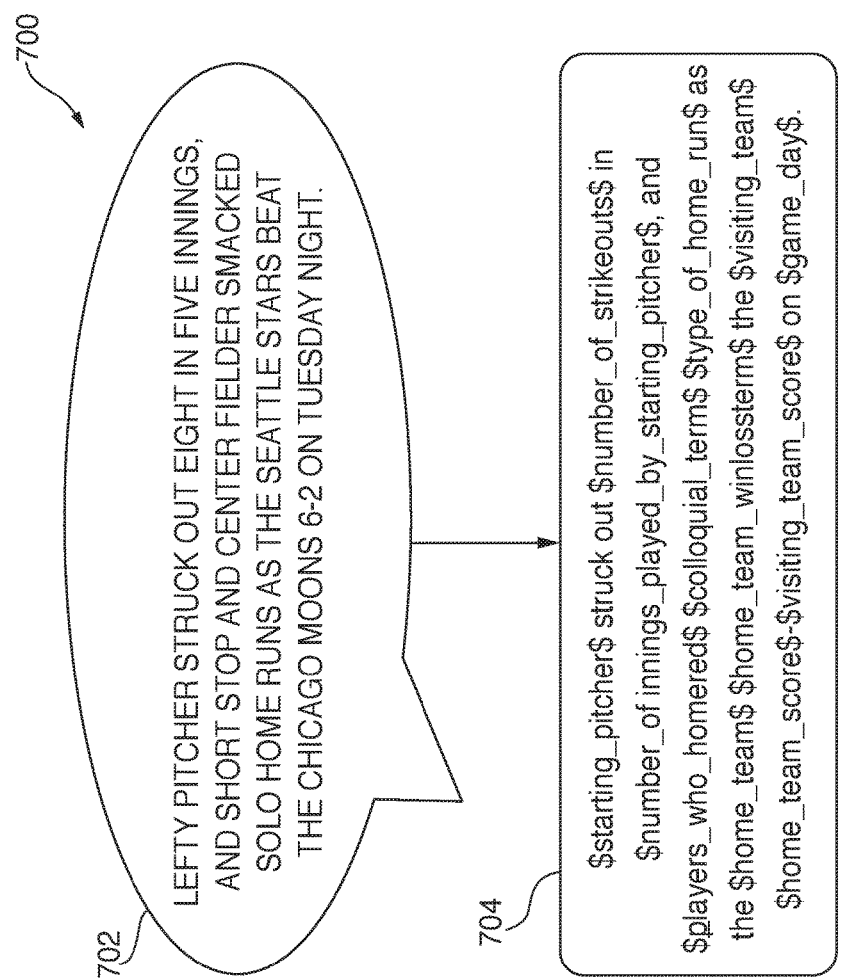
FIG. 7 is an illustrative diagram for generating a response model, in accordance with various embodiments.

FIG. 7 is an illustrative diagram for generating a response model, in accordance with various embodiments. Scenario 700, in one exemplary embodiment, may include news data 702 and response model 704. As mentioned previously, NLG module 500 may generate models of speech patterns, such common phrases and/or words, for populating word database 510 and phrase database 512. One technique for generating a model of the speech pattern is to analyze news or other media from various geographic locations to determine the types of words and phrases typically used by individuals from such geographic locations.

News data 702, for example, may correspond to sports news provided by a sports new provider of a particular location, such as Seattle, Wash. In some embodiments, news data 702 may be converted from speech to text using STT module 266 of backend system 100. STT module 266 may analyze each word, or group of words, from news data 702 to determine what each word is. For example, each word may be compared to one or more words stored in word database 510 on NLG module 500 to determine if the words match beyond a threshold value. If so, then the word from within news data 702 is defined as being that particular word from word database 510. The techniques to identify each word within news data 702 may, for instance, be substantially similar to those techniques employed to identify a particular wakeword. However, instead of converting news data 702 to text, in some embodiments, audio of news data 702 may be analyzed for a particular sound profile associated with one or more words. For example, keyword spotting technology may be employed to identify each word.

In some embodiments, response model 704 may be generated from news data 702 such that each variable is identified, and the structure of the words from news data 702 is also obtained. For instance, a person's name, such as "Lefty Pitcher," within news data 702 may generate a variable "$starting_pitcher$." In this way, subsequent response modeled after news data 702 may be capable of replacing the variable, "$starting_pitcher$" with an appropriate name for that particular response. Similarly, the date "Tuesday" may generate a variable "$game_day$," which corresponds to a date of the event that news data 702 corresponds to. Furthermore, one or more synonyms of words included within news data 702 may be identified. For example, the word "smacked" may generate a variable "$colloquial_term$." Thus, synonyms to the word smacked, or the act of hitting a home run, may be used within this response model.

Using news data 702 to generate response model 704 is one exemplary technique for training models to be used for NLG module 500 for generating responses to commands. Various other techniques include, but are not limited to, speech recognition from individuals, books or other text based information sources, radio and/or television broadcasts, or any other suitable language source, or any combination thereof. In some embodiments, NLG module 500 of backend system 100 may be analyzed offline to determine if the generated response models are logic in form and style.

In some embodiments, the news data may be used as training data to train the models for identifying various aspects of a sentence's structure. For example, the sentence "Yesterday teamB lost to teamA 110 to 90" may be deconstructed individual components. The word, "yesterday," may correspond to a time modifier object, "teamb" may correspond to a subject, "lost to" may correspond to a verb, "teamA" may correspond to an object, "110" may correspond to a score modifier for the subject's score, "to" may correspond to a score modifier, and "90" may correspond to a score modifier for the object's score. Therefore, the deconstructed sentence may appear to be of the form "TeamModifierObject Subject Verb Object ScoreModifierSubject ScoreModifier ScoreModifierObject." When news data, such as news data 702, is received, it may be parsed, and each component of the sentence may be identified such that those identified components may be repurposed for a response to a command. In some embodiments, additional sentence components, such as a verb modifier (e.g., "Fortunately" or "Unfortunately") may also be included within the sentence's structure.

FIG. 8 is an illustrative flowchart of a process for providing responses based on a feature value, in accordance with various embodiments. Process 800 may begin at step 802. At step 802, audio data representing speech may be received by backend system 100. For example, individual 20 may ask question 6 to voice activated electronic device 10, which in turn may provide audio data representing question 6 to backend system 100. At step 804, text data may be generated from the audio data by executing speech to text functionality on the received audio data. For example, audio data 16 may be provided to ASR module 258 on backend system 100. ASR module 258 may then execute speech to text functionality to audio data 16 by using STT module 266, thereby generating text data that represents question 6. Steps 802 and 804 may, in some embodiments, be substantially similar to steps 302 and 304 of FIG. 3, and the previous description may apply.

At step 806, a user intent or context of the speech represented by the generated text data may be determined. For example, the intent of question 6 may be for a current score of a baseball game for the baseball team, the Zebras. The intent or context of the speech may be determined using NLU module 260. In some embodiments, NLU module 260 analyzes the words within the text data representing the speech to determine if any of the words match a keyword of particular category server/skill of category servers/skills module 262. For example, words associated with the weather category server or weather application may include, but are not limited to, "weather," "forecast," "temperature," "rain," etc. If one of these words, for instance, is determined by NLU module 260 to be within the speech, then NLU module 260 may determine that the individual's user intent is for the weather. As another example, keywords associated with a sports application may include, but are not limited to, "baseball," "football," "basketball", "hockey," etc. If one of these words is determined to be present within the speech, then NLU module 260 may determine that the user intent is for a particular sport. In some embodiments, upon determination of the user intent, such as by identification of one or more keywords within the speech, the category server/skill or application that is associated with that keyword with may be determined, and the category server/skill/application may be accessed by backend system 100 at step 808. At step 810, response information may be obtained from the related category server/application. For example, if the user intent is for a score of a baseball game, at step 810 the score of the baseball game may be obtained from the sports category server.

At step 812, a location of individual 20 may be determined by backend system 100. In some embodiments, in addition to receiving audio data 16 representing question 6 from voice activated electronic device 10, backend system 100 may also receive geographic metadata from voice activated electronic device 10 indicating a geographic location of voice activated electronic device 10. For example, an IP address of voice activated electronic device 10 may be provided with audio data 16, which may indicate a location of voice activated electronic device 10, which may also indicate an approximate location of individual 20. In some embodiments, however, determining location at step 812 may be optional, and process 800 may proceed from step 810 to step 814.

At step 814, a level of formality to use for a response may be determined. In some embodiments, the level of formality may be based on the determined location, previous responses that have been generated, a particular user account determined to be associated with the speech that has been provided, or any other feature, or any combination thereof. For example, the level of formality may be based on the geographic location. Different geographic locations may speak different languages, and even different dialects of the same language. For example, although individuals from the Northeast region of the United States and individuals from the Southeast region of the United States both speak English, the dialect that each region speaks with may differ. Thus, at step 814, a dialect, as well as a language, may be determined for the particular geographic location that the geographic metadata received from voice activated electronic device 10 is associated with.

At step 816, a response may be generated that is formulated for the level of formality that was determined. The response may also include the response information previously determined at step 810. For example, for question 6 (e.g., "Alexa—What is the score of the Zebras' game?"), the score information—Zebras: 15, Cauliflowers: 10—may be obtained from the sports application of category servers/skills module 262. Furthermore, voice activated electronic device 10 may have an IP address that indicates that it is located in Seattle, Wash., and therefore, a dialect associated with the Northwest region of the United States may be used by NLG module 500, along with the score information, to generate one or more responses (e.g., Responses A-D of FIG. 6).

At step 818, a feature value for the response generated at step 816 may be determined. The feature value may indicate how accurate and/or appropriate the response(s) are that were generated at step 816. For example, responses that are the same, or substantially the same, as one or more previously generated responses may have a lower feature value than responses that have are different and unique as compared to those previously generated responses. As another example, responses that account for a user preference, such as a particular team with which an individual is a fan of, may have a higher feature value than responses that do not account for the user preference. As yet another example, responses that include words or phrases associated with a particular geographic region, or dialect of that geographic region, that the requesting device (and individual) is associated with may have a higher feature value than responses that are generated having no familiarity to the particular geographic location.

As mentioned previously, NLG module 500 may generate multiple responses in parallel, or NLG module 500 may generate one response at a time. In the latter's case, however, a determination may be made, at step 820, as to whether or not the generated response's feature value is greater than a threshold feature value for selecting a particular response. For example, if a threshold feature value for a response's feature value is set at 8 or higher, Response B of FIG. 6 would correspond to a response whose feature value exceeds the predefined threshold value. As another example, using the predefined threshold feature value of 8, Responses A, C, and D would each not be greater than the predefined threshold feature value. If, at step 820, it is determined that the feature value of the response generated at step 816 is greater than the predefined threshold feature value, then process 800 may proceed to step 822. However, if at step 820 it is determined that the feature value of the response generated at step 816 is less than or equal to the predefined threshold feature value, then process 800 may proceed to step 826. Persons of ordinary skill in the art will recognize that any threshold feature value may be used, and the aforementioned is merely exemplary.

At step 822, responsive audio data representing the response may be generated. For example, the response generated at step 816 may include the response information, such as the score of the Zebras' game, as well as words or phrases associated with a dialect of a particular geographic location. Responsive audio data may then be generated using this response by providing the response to TTS module 264 from NLG module 500. After responsive audio data is generated, it may be sent from backend system 100 to voice activated electronic device 10, which in turn may output audible response 8 from speaker(s) 210.

At step 826, a new arrangement of the words and/or new words for a response may be determined. For example, if the response is substantially the same as a previously provided response, then new words for a selected set of words from word database 510 and/or phrase database 512 may be determined for use in a new response. As an illustrative example, response 4 to question 2 may have been, "Zebras: 15; Cauliflowers: 10." In this particular scenario, for question 6, if Response A of FIG. 6 is generated, then its feature value may be lower than a predefined threshold feature value, and new words for a new response may be determined. At step 828, the new response is generated using the newly determined words and/or arrangement of words. For example, Response B—"The Zebras are winning, 15 to 10"—may be generated at step 828. After the new response is generated at step 828, a feature value for the new response is determined, and a determination is made as to whether or not the new response has a feature value greater than the predefined threshold feature value. If so, the process will proceed to step 822. However, if not, process 800 will proceed to step 826 again, were another new response is generated.

The various embodiments of the invention may be implemented by software, but may also be implemented in hardware, or in a combination of hardware and software. The invention may also be embodied as computer readable code on a computer readable medium. The computer readable medium may be any data storage device which may thereafter be read by a computer system.

The above described embodiments of the invention are presented for purposes of illustration and are not intended to be limiting. Although the subject matter has been described in language specific to structural feature, it is also understood that the subject matter defined in the appended claims is not necessarily limited to the specific features described. Rather, the specific features are disclosed as illustrative forms of implementing the claims.

What is claimed is:

1. A computer-implemented method for generating natural responses to questions using historical information, the method comprising:
   receiving, from an electronic device, first audio data corresponding to a first question;
   determining a user account associated with the electronic device;
   generating first text data from the first audio data using automatic speech recognition processing;
   determining, using natural language understanding functionality, that the question is for information that is accessible from an application;
   obtaining at least a first data value from the application;
   determining at least a portion of a first response to the first question, the first response having a first format;
   determining that a second response to a second question was previously sent to at least one device associated with the user account;
   determining a degree of similarity between at least the portion of the first response having the first format and at least a portion of the second response;
   determining that the degree of similarity exceeds a threshold;
   based at least in part on a determination that the degree of similarity exceeds the threshold, determining a second format for the first response, the second format identifying a first position at which the first information is to be included within an arrangement of words and being different than the first format mat;
   and
   sending the first response having the second format to the electronic device.

2. The method of claim 1, wherein determining that the degree of similarity exceeds the threshold comprises:
   accessing a response history that includes second text data corresponding to the portion of the second response;
   determining each word represented by the second text data;
   determining that each word represented by the second text data is also represented by third text data corresponding to the portion of the first response;
   determining that an order of the words represented by the second text data is the same as an order of the words represented by the third text data; and
   determining that the second text data is the same as the third text data.

3. The method of claim 1, further comprising:
   determining an IP address associated with the electronic device that provided the first audio data;
   determining a geographic location of the electronic device based on the IP address;
   determining a language associated with the geographic location;
   selecting a word database associated with the language such that at least one word included in the first response is in the language;
   determining a dialect of the language based on the geographic location; and
   determining a pronunciation of the at least one word based on the dialect.

4. The method of claim 1, wherein the information corresponds to a score of a game for a team, and wherein determining the second format for the first response further comprises:
  determining, based on the score of the game, a team's score and an opposing team's score;
  determining that the team's score is greater than the opposing team's score;
  determining a difference between the team's score and the opposing team's score;
  determining that the difference is more than a threshold point differential;
  determining an interjection to be used for the first response based on the team's score being greater than the opposing team's score and the difference; and
  determining the second format such that the second format further identifies a second position at which the interjection is to be included within the arrangement of words.

5. The method of claim 1, wherein sending the first response comprises sending audio data corresponding to the first response having the second format to the requesting device.

6. The method of claim 1, wherein the first format identifies a second position at which the first information is to be included within the arrangement of words, the second position being different than the first position.

7. A computer-implemented method, comprising:
  receiving, from a requesting device, first audio data representing speech;
  determining a user account associated with the requesting device;
  determining that the speech corresponds to a first query for information that is accessible from an application;
  receiving, from the application, first information responsive to the first query;
  determining at least a portion of a first response to the first query, the first response having a first format;
  determining that a second response to a second query was previously sent to at least one device associated with the user account;
  determining a first degree of similarity between at least the portion of the first response having the first format and at least a portion of the second response;
  determining that the first degree of similarity exceeds a first threshold;
  based at least in part on a determination that the first degree of similarity exceeds the first threshold, determining a second format for the first response, the second format identifying a first position at which the first information is to be included within an arrangement of words and being different than the first format; and
  sending the first response having the second format to the requesting device.

8. The method of claim 7, further comprising:
  determining an interjection for the first response; and
  determining the second format such that the second format further identifies a second position at which the interjection is to be included within the arrangement of words.

9. The method of claim 7, further comprising:
  receiving geographic metadata in addition to the first audio data; and
  determining a geographic location associated with the speech based on the geographic metadata.

10. The method of claim 9, further comprising:
  determining a dialect associated with the geographic location;
  determining a pronunciation of the words using the dialect; and
  determining an the arrangement of words such that the words are organized in a manner consistent with a speech pattern of the geographic location.

11. The method of claim 7, further comprising:
  determining a time window that preceded a time at which the portion of the first response was determined;
  determining that the second response was sent to the device associated with the user account within the time window; and
  determining the second format for the first response based at least in part on a determination that the second response was sent to the device within the time window.

12. The method of claim 7, further comprising:
  determining that second audio data corresponding to a third query was previously received from at least one device associated with the user account;
  determining a second degree of similarity between the first query and the third query;
  determining that the second degree of similarity exceeds a second threshold; and
  determining the second format for the first response based at least in part on a determination that the second degree of similarity exceeds the second threshold.

13. The method of claim 12, further comprising:
  determining a time window that preceded a time at which the first audio data was received;
  determining that the second audio data was received from the electronic device within the time window; and
  determining the second format for the first response based at least in part on a determination that the second audio data was received from the electronic device within the time window.

14. The method of claim 7, wherein sending the first response comprises sending audio data corresponding to the first response having the second format to the requesting device.

15. The method of claim 7, wherein the first format identifies a second position at which the first information is to be included within the arrangement of words, the second position being different than the first position.

16. A system, comprising:
  at least one processor; and
  at least one non-transitory computer-readable medium encoded with instructions which, when executed by the at least one processor, cause the system to:
    receive, from an electronic device, first audio data corresponding to speech,
    determine a user account associated with the electronic device,
    determine that the speech corresponds to a first query for information that is accessible from an application,
    receive, from the application, first information responsive to the first query,
    determine that a second query was previously received from at least one device associated with the user account,
    determine a first degree of similarity between the first query and the second query,
    determine that the first degree of similarity exceeds a first threshold, based at least in part on a determination that the first degree of similarity exceeds the first threshold, determine a first format for a first response to the first query, wherein the first format identifies a first position at which the first information is to be included within an arrangement of words, and send the first response having the first format to the electronic device.

17. The system of claim 16, wherein the at least one computer-readable medium is encoded with additional instructions which, when executed by the at least one processor, further cause the system to:

determine an interjection for the first response; and determine the first format such that the first format further identifies a second position at which the interjection is to be included within the arrangement of words.

18. The system of claim 16, wherein the at least one computer-readable medium is encoded with additional instructions which, when executed by the at least one processor, further cause the system to:

receive geographic metadata in addition to the first audio data; and determine a geographic location associated with the speech based on the geographic metadata.

19. The system of claim 18, wherein the at least one computer-readable medium is encoded with additional instructions which, when executed by the at least one processor, further cause the system to:

determine a dialect associated with the geographic location;

determine a pronunciation of the words using the dialect; and determine the arrangement of words such that the words are organized in a manner consistent with a speech pattern of the geographic location.

20. The system of claim 16, wherein the at least one computer-readable medium is encoded with additional instructions which, when executed by the at least one processor, further cause the system to:

determine a time window that preceded a time at which the first audio data was received;

determine that the second query was received from the electronic device within the time window; and determine the first format for the first response based at least in part on a determination that the second query was received from the electronic device within the time window.

21. The system of claim 16, wherein the at least one computer-readable medium is encoded with additional instructions which, when executed by the at least one processor, further cause the system to:

determine at least a portion of a differently formatted response to the first query, the differently formatted response having a second format;

determine that a second response to a third query was previously sent to at least one device associated with the user account;

determine a second degree of similarity between at least the portion of the differently formatted response and at least a portion of the second response;

determine that the second degree of similarity exceeds a second threshold; and determine the first format, based at least in part on a determination that the second degree of similarity exceeds the second threshold, such that the first format is different than the second format.

22. The system of claim 21, wherein the at least one computer-readable medium is encoded with additional instructions which, when executed by the at least one processor, further cause the system to:

determine a time window that preceded a time at which the portion of the differently formatted response was determined;

determine that the second response was sent to the device associated with the user account within the time window; and determine the first format for the first response based at least in part on a determination that the second response was sent to the device within the time window.

23. The system of claim 21, wherein the second format identifies a second position at which the first information is to be included with the arrangement of words, the second position being different than the first position.

24. The system of claim 16, wherein the at least one computer-readable medium is encoded with additional instructions which, when executed by the at least one processor, further cause the system to:

send audio data corresponding to the first response having the first format to the requesting device.

* * * * *